(12) United States Patent
Crain et al.

(10) Patent No.: US 8,490,937 B2
(45) Date of Patent: Jul. 23, 2013

(54) MOUNT SYSTEM FOR HANDHELD ELECTRICAL DEVICE

(75) Inventors: Stephen B. Crain, Cape Girardeau, MO (US); Ralph C. Mize, Jonesboro, IL (US); Christopher T. Moore, Creal Springs, IL (US); Jerry L. Williamson, Olmsted, IL (US); Brandon T. Spitzmiller, Cape Girardeau, MO (US); Larry W. Essex, Villa Ridge, IL (US); Clinton J. Mize, Jonesboro, IL (US)

(73) Assignee: Seco Manufacturing Company, Inc., Sunnyvale, CA (US)

( * ) Notice: Subject to any disclaimer, the term of this patent is extended or adjusted under 35 U.S.C. 154(b) by 2118 days.

(21) Appl. No.: 11/107,146

(22) Filed: Apr. 15, 2005

(65) Prior Publication Data
US 2006/0231713 A1 Oct. 19, 2006

(51) Int. Cl.
*A47G 29/00* (2006.01)

(52) U.S. Cl.
USPC ............. 248/316.6; 248/316.4; 224/929

(58) Field of Classification Search
USPC ....... 248/309.1, 316.4, 316.6, 230.1; 224/929
See application file for complete search history.

(56) References Cited

U.S. PATENT DOCUMENTS

| 2,021,241 | A | 11/1935 | Mall |
| 4,041,811 | A | 8/1977 | Durant |
| 4,179,771 | A | 12/1979 | Rankins et al. |
| 4,561,682 | A | 12/1985 | Tisserat |
| 4,591,192 | A | 5/1986 | Van Exel |
| 4,614,452 | A | 9/1986 | Wang |
| 4,641,804 | A | 2/1987 | Martin et al. |
| 4,721,331 | A | 1/1988 | Lemelshtrich |
| 4,832,299 | A | 5/1989 | Gorton et al. |
| D312,040 | S | 11/1990 | Johnson, Jr. |
| 4,993,280 | A | 2/1991 | Olkoski et al. |
| 5,018,886 | A | 5/1991 | Hiramatsu |
| 5,033,709 | A * | 7/1991 | Yuen ............................. 379/454 |
| 5,154,557 | A | 10/1992 | Houck |
| 5,187,744 | A | 2/1993 | Richter |
| 5,197,161 | A | 3/1993 | Howie, Jr. |
| 5,305,381 | A | 4/1994 | Wang et al. |
| 5,344,115 | A | 9/1994 | Mayne |
| 5,386,961 | A | 2/1995 | Lu |
| 5,388,434 | A | 2/1995 | Kalis |

(Continued)

OTHER PUBLICATIONS

Seco Controller/Collector Cradle: Allegro, Jett CE, www.surveying. com., 1 page, admitted prior art.

(Continued)

*Primary Examiner* — Terrell McKinnon
*Assistant Examiner* — Steven Marsh
(74) *Attorney, Agent, or Firm* — Senniger Powers LLP

(57) ABSTRACT

A cradle for a handheld electrical device comprises a base constructed to support the device such that the device can be freely placed on and removed from the base. At least one arm is operatively connected to the base for movement relative to the base and the device. An actuator moves the arm between a release position wherein the arm is spaced from the device, allowing the device to be freely removed from and placed on the base, and a hold position wherein the arm engages and holds the device in the cradle. The cradle is adapted for attachment to an object in a first orientation on a right-hand side of the object and in a second orientation on a left-hand side of the object. The cradle is arranged to hold the device in an upright position in both orientations.

17 Claims, 36 Drawing Sheets

U.S. PATENT DOCUMENTS

| | | | |
|---|---|---|---|
| 5,392,350 | A | 2/1995 | Swanson |
| 5,442,866 | A | 8/1995 | Woods |
| 5,457,745 | A | 10/1995 | Wang |
| D363,936 | S | 11/1995 | Nysether et al. |
| 5,480,115 | A | 1/1996 | Haltof |
| 5,503,357 | A | 4/1996 | Johnson |
| 5,509,569 | A | 4/1996 | Hiranuma et al. |
| 5,555,302 | A | 9/1996 | Wang |
| 5,570,529 | A | 11/1996 | Amelino |
| D376,974 | S | 12/1996 | Chen |
| 5,589,288 | A | 12/1996 | Coulson et al. |
| 5,593,187 | A | 1/1997 | Okuda |
| 5,615,258 | A | 3/1997 | Ho |
| 5,615,854 | A | 4/1997 | Nomura |
| 5,626,320 | A | 5/1997 | Burrell |
| 5,681,667 | A | 10/1997 | Bunyea et al. |
| 5,694,468 | A | 12/1997 | Hsu |
| 5,704,583 | A | 1/1998 | Putland et al. |
| 5,788,202 | A | 8/1998 | Richter |
| 5,791,609 | A | 8/1998 | Hankins |
| 5,836,563 | A | 11/1998 | Hsin-Yung |
| 5,845,885 | A | 12/1998 | Carnevali |
| 5,856,038 | A | 1/1999 | Mason |
| 5,857,242 | A | 1/1999 | Pizzo et al. |
| 5,903,645 | A | 5/1999 | Tsay |
| 5,933,915 | A | 8/1999 | El Dessouky et al. |
| 5,947,359 | A | 9/1999 | Yoshie |
| D415,017 | S | 10/1999 | Lo |
| 5,961,016 | A | 10/1999 | Hartmann et al. |
| 5,982,885 | A | 11/1999 | Ho |
| 6,085,113 | A | 7/2000 | Fan |
| 6,095,470 | A | 8/2000 | Kalis |
| 6,097,810 | A | 8/2000 | Hirai et al. |
| 6,196,943 | B1 | 3/2001 | Chen |
| 6,215,870 | B1 | 4/2001 | Hirai et al. |
| 6,229,891 | B1 | 5/2001 | Chen |
| 6,238,155 | B1 | 5/2001 | Aukzemas et al. |
| 6,285,758 | B1 | 9/2001 | Lu |
| 6,315,182 | B1 | 11/2001 | Chen |
| 6,328,280 | B1 | 12/2001 | Davidson |
| 6,364,585 | B1 | 4/2002 | Sakamoto |
| 6,366,672 | B1 | 4/2002 | Tsay |
| 6,427,959 | B1 | 8/2002 | Kalis et al. |
| D464,250 | S | 10/2002 | Warner et al. |
| 6,463,630 | B1 | 10/2002 | Howie, Jr. |
| 6,467,131 | B1 | 10/2002 | Howie, Jr. |
| 6,502,321 | B1 | 1/2003 | Crain et al. |
| D473,129 | S | 4/2003 | Warner et al. |
| 6,585,212 | B2 | 7/2003 | Carnevali |
| 6,627,004 | B1 | 9/2003 | Lockhart |
| 6,631,877 | B1 | 10/2003 | Crain et al. |
| 6,659,409 | B2 | 12/2003 | Ashjaee |
| 6,665,524 | B1 | 12/2003 | Niemann |
| 6,688,012 | B1 | 2/2004 | Crain et al. |
| 6,688,566 | B1 | 2/2004 | Crain et al. |
| 6,711,826 | B2 | 3/2004 | Crain et al. |
| 6,772,526 | B1 | 8/2004 | Crain et al. |
| 6,824,319 | B1 | 11/2004 | Spegglorin |
| 6,966,533 | B1 | 11/2005 | Kalis |
| 7,093,313 | B2 | 8/2006 | DeBraal |
| 7,111,707 | B2 | 9/2006 | Reeves |
| 2002/0009194 | A1 | 1/2002 | Wong et al. |
| 2002/0104944 | A1 | 8/2002 | Pogatetz et al. |
| 2002/0190176 | A1 | 12/2002 | Louh |
| 2002/0192019 | A1 | 12/2002 | Wack |
| 2003/0058531 | A1 | 3/2003 | Baun |
| 2003/0218113 | A1 | 11/2003 | Sullivan |
| 2003/0226941 | A1 | 12/2003 | Crain et al. |
| 2003/0234326 | A1 | 12/2003 | Crain et al. |
| 2003/0235459 | A1 | 12/2003 | Crain et al. |
| 2004/0000622 | A1 | 1/2004 | Crain et al. |
| 2004/0004168 | A1 | 1/2004 | Crain et al. |
| 2004/0026590 | A1 | 2/2004 | Lin |
| 2004/0075031 | A1 | 4/2004 | Crain et al. |
| 2004/0227040 | A1 | 11/2004 | Crain et al. |
| 2005/0135047 | A1 | 6/2005 | Fathallah |
| 2006/0233601 | A1 | 10/2006 | Crain |

OTHER PUBLICATIONS

Seco Controller/Collector Cradle: PDA Universal, 1 page, admitted prior art.
Seco Controller/Collector Pole Clamp: On-board Compass, 1 page, admitted prior art.
Seco Controller/Collector Pole Clamp: Plain, 1 page, admitted prior art.
Seco Controller/Collector Pole Clamp: With built-in Accessory Slot, 1 page, admitted prior art.
RAM Slide-N-Lock, 1 page, admitted prior art.
Seco 5199-Series Ball-And-Socket Controller/Collector Bracket, 1 page, admitted prior art.
Seco Tripod Bracket: TSCE/Ranger, FS Series, 1 page, admitted prior art.
Office Action and references dated Jul. 27, 2007 from U.S. Appl. No. 11/107,441, 10 pages.
Office Action and references dated Jan. 18, 2007 from U.S. Appl. No. 11/107,122, 12 pages.
Office Action and references dated Jul. 11, 2007 from U.S. Appl. No. 11/107,122, 8 pages.
Office action dated Feb. 9, 2009 regarding U.S. Appl. No. 11/938,605, 12 pages.
Office action dated Jun. 30, 2008 regarding U.S. Appl. No. 11/107,441, 35 pages.

* cited by examiner

MOUNT SYSTEM FOR HANDHELD ELECTRICAL DEVICE

BACKGROUND OF THE INVENTION

This invention relates generally to devices that support and hold equipment and more particularly to a mount system for holding handheld electrical devices.

Handheld electrical devices, such as handheld computers (e.g., data collectors, PDAs, Blackberrys™) and cellular phones, are widely used and have many applications. For example, many land surveyors use handheld electrical data collectors to record and store field measurements, perform calculations, verify data accuracy, and even generate plots. Data collectors equipped for surveying can be connected directly to surveying equipment (e.g., a total station) for recording data and then to a PC or notebook computer for transferring the data from the data collector. Thus, data collectors allow surveyors to quickly, easily, and accurately collect surveying data and transfer it to a PC or notebook computer.

During a survey of land, the data collector is commonly supported by a holder mounted to a surveying pole or tripod. One difficulty with mounting the holder directly to the surveying pole or tripod is that surveying implements, once positioned to collect survey data, often cannot be disturbed without compromising the accuracy of the survey. As a result, the surveyor needs to exercise care when using the data collector not to disturb the positioning of the pole or tripod.

Conventional holders typically include a support for supporting the data collector, and a clamp for clamping the support to surveying pole or tripod. In some cases, the support is merely a rest without any positive connection between the support and the data collector. This allows the data collector to be placed into and removed from the holder with minimum effort and minimum potential for disturbing the placement of the surveying pole or tripod. This is helpful, for example, when the surveyor is manually entering surveying data or descriptions of surveyed locations. Since there is no positive connection between the support and the data collector, the device must be removed from the support before moving the pole or tripod otherwise the data collector will fall from the support and be damaged. Requiring the data collector to be carried separately is highly inconvenient for surveyors who may work in remote locations and manually transport their equipment.

In other cases, the support does positively connect to the data collector to securely hold the data collector in the support. While this arrangement prevents the data collector from falling from the support, it is difficult to manually enter survey data or descriptions of surveyed locations since the data collector cannot be simply picked up off the support. Moreover, the act of connecting the data collector to the support typically requires discontinuous motion, such as turning a screw knob, which may result in undesired vibration or movement of the tripod or pole thereby compromising accuracy of the survey.

In addition, the angle at which the support holds the data collector greatly affects the ability of the data collector to be used or viewed. Factors such as the height of the pole (or tripod), the location on the pole where the data collector is clamped, the height of the surveyor, and the angle of the sun all affect the ease of use and visibility of the data collector. Accordingly, some prior art holders allow the surveyor to adjust the angle at which the data collector is supported. To do so, however, the connection between the prior art supports and clamps needs to be released or loosened, the support adjusted to the desired angle, and the connection between the support and clamp reestablished. Thus, this is a somewhat time consuming process that requires two hands and could easily result in the undesired movement of the pole or tripod.

Conventional holders are also made for either right-handed users or left-handed users. In other words, the holder will retain the data collector in an upright, forward facing position only when projecting to one side of the pole or tripod (from the vantage of a person facing the pole or tripod). As a result, left-handed surveyors typically have to reach across their bodies to manipulate the data collector. This is particularly inconvenient when they must simultaneously hold the pole.

Moreover, conventional clamps of the holders resemble C-clamps with a coupling for connecting the support thereto. These types of clamping devices have a screw with a screw knob for tightening and loosening a jaw of the clamp. The jaw and anvil of the clamp may make only point or line contact with the pole or tripod. The small area of contact requires the jaw to press hard against the pole to secure the holder in place. Another adverse effect of the small area of contact is that the clamp is still unstable. Moreover, the screw and screw knob arrangement is prone to overtightening. Thus, this arrangement can cause irreparable damage to poles or tripods by repeated tightening (or overtightening) of the clamp to the same position on the pole.

SUMMARY OF THE INVENTION

Generally, a cradle for a handheld electrical device having a front, a back, a bottom, a top and sides comprises a base constructed to support the device at an angle free of connection to the base such that the device can be freely placed on and removed from the base. At least one arm is operatively connected to the base for movement relative to the base and the device when supported on the base. An actuator moves the arm relative to the base between a release position wherein the arm is spaced from the device, allowing the device to be freely removed from and placed on the base, and a hold position wherein the arm is closer to the device for engaging and holding the device in the cradle.

In another aspect of the present invention, a utility mount for supporting a handheld electrical device on an object comprises a holder sized and shaped for holding the device, and an attachment device for securing the holder on an object. A connector connects the holder to the attachment device. The holder is adapted for releasable attachment to the connector in a first orientation in which the holder is arranged to hold the object in an upright position on a right-hand side of the object for direct access by a right-hand and for releasable attachment to the connector in a second orientation different from the first orientation in an upright position on a left-hand side of the object for direct access by a left hand.

Other objects and features of the present invention will be in part apparent and in part pointed out hereinafter.

BRIEF DESCRIPTION OF THE DRAWINGS

Corresponding reference characters indicate corresponding parts throughout the several views of the drawings.

DETAILED DESCRIPTION OF THE PREFERRED EMBODIMENTS

Figure 1:
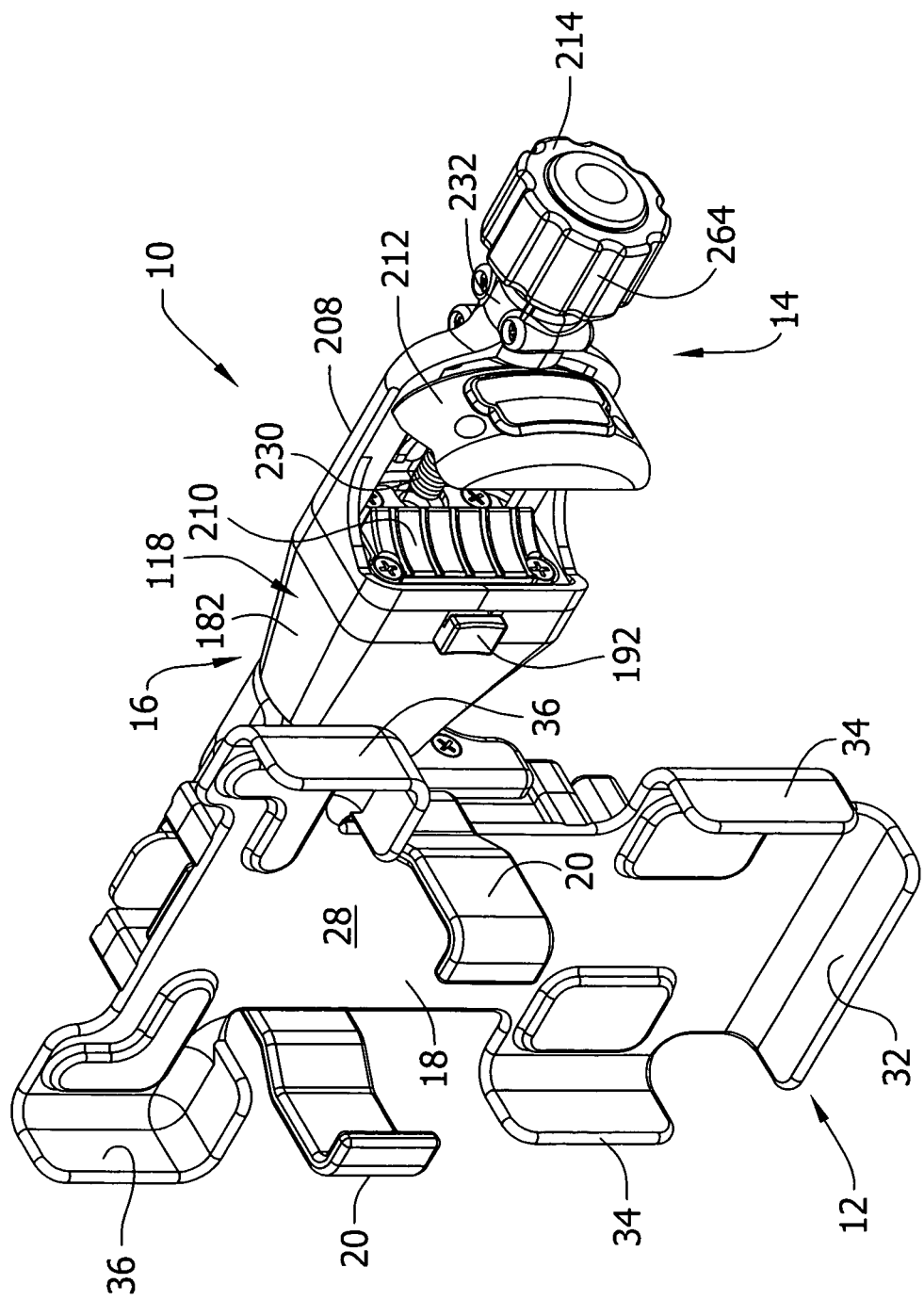
FIG. 1 is a perspective of a mount system of the present invention for holding a data collector.
Figure 2:
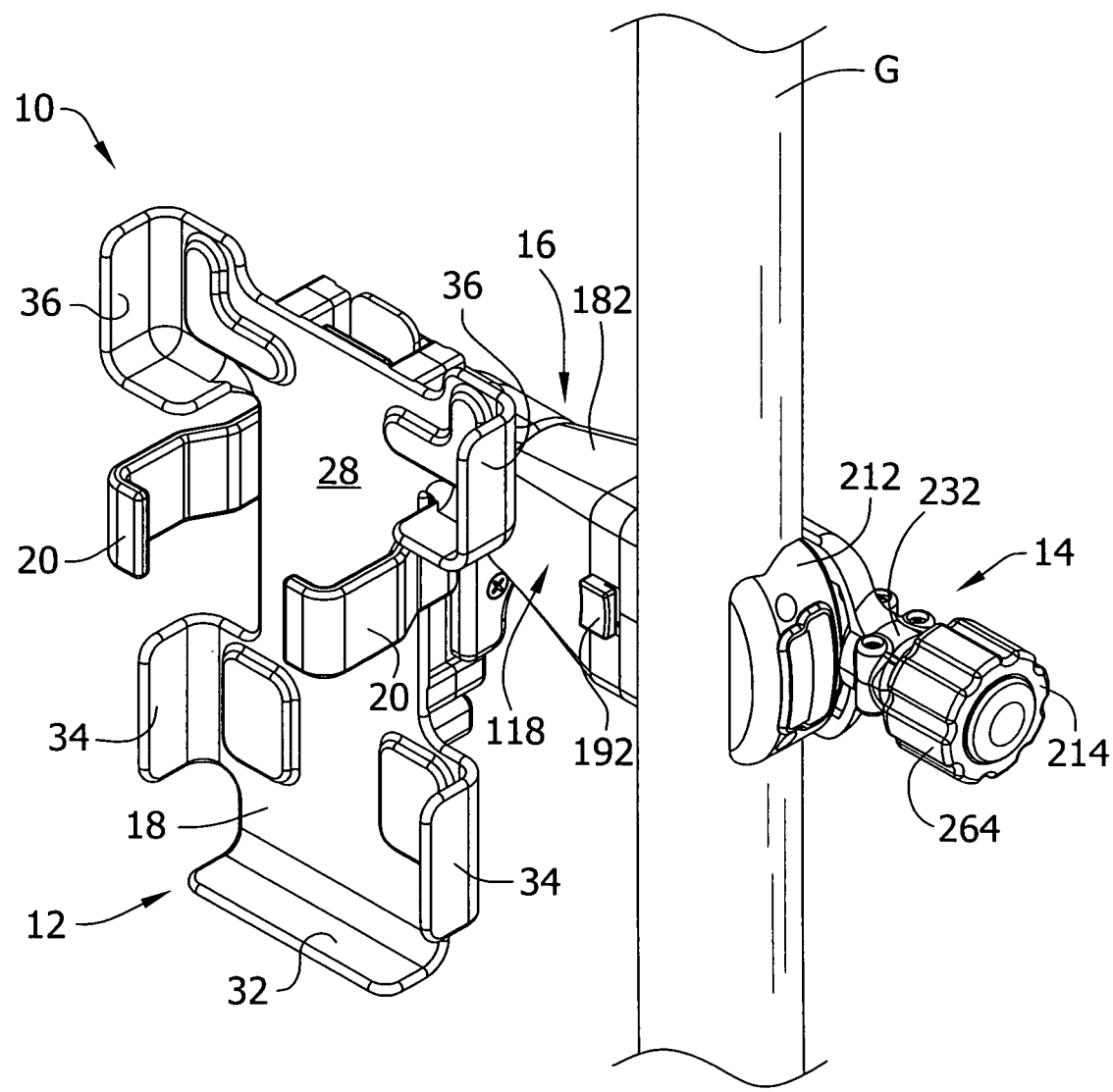
FIG. 2 is a perspective of the mount system attached to a portion of a geomatics pole for use by a left-handed user.
Figure 3:
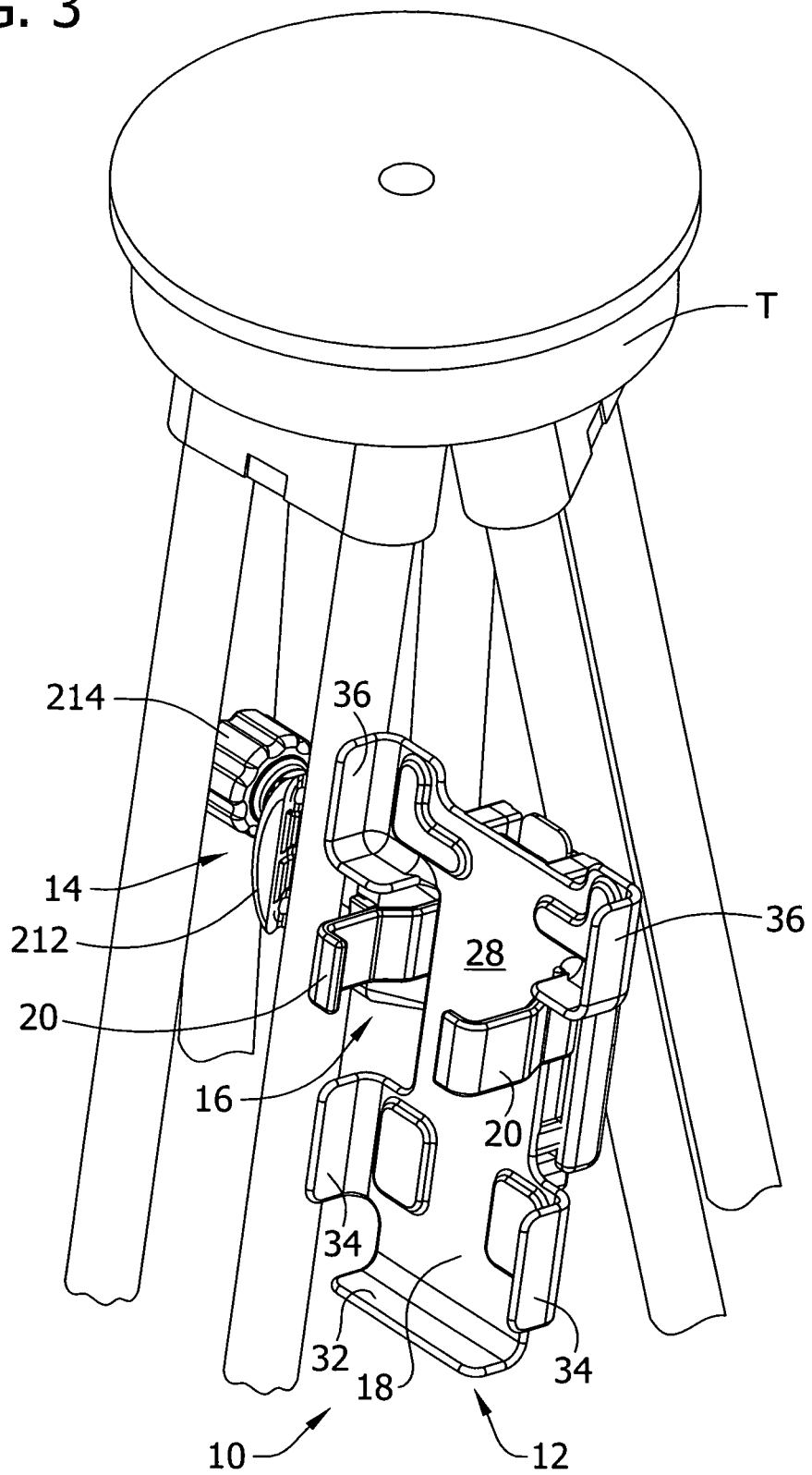
FIG. 3 is a perspective of the mount system attached to a leg portion of a tripod for use by a right-handed user.

Referring now to the drawings, and in particular to FIGS. 1-5, a handheld electrical device mount system of the present invention, generally indicated at 10, is shown. The mount system 10 includes a cradle 12 (broadly, "holder") for supporting an electrical device such as data collector D, a clamp 14 for securing the cradle to an object, and a coupler 16 connecting the cradle to the clamp (the numbers designating their subjects generally). The mount system 10 is shown attached to a geomatics pole G (FIG. 2) and a tripod T (FIG. 3). Details of a suitable geomatics pole and a suitable tripod (broadly, "geomatics supports") can be found in co-assigned U.S. Pat. Nos. 6,772,526 and 6,685,566, respectively, which are incorporated herein by reference in their entireties. As used herein "geomatics" is intended to encompass surveying and geographic positioning.

The mount system 10 can be attached to objects other than geomatics poles, tripods, or other geomatics equipment without departing from the scope of this invention. For example, some embodiments (not shown) of the present invention can be mounted to the handlebars of a vehicle (e.g., an all terrain vehicle) or to the dashboard of a passenger vehicle (e.g., car, truck, van). In addition, the mounting system 10 can be attached to the object using attachment devices other than the clamp 14. For example, in the embodiment of the mounting system adapted to be mounted to the dashboard of a passenger vehicle, the attachment device could be a flange having fastening holes for directly fastening the attachment device to the object. In the embodiment of the mounting system adapted to be mounted to handlebars, the attachment device could be a U-bolt.

Figure 4:
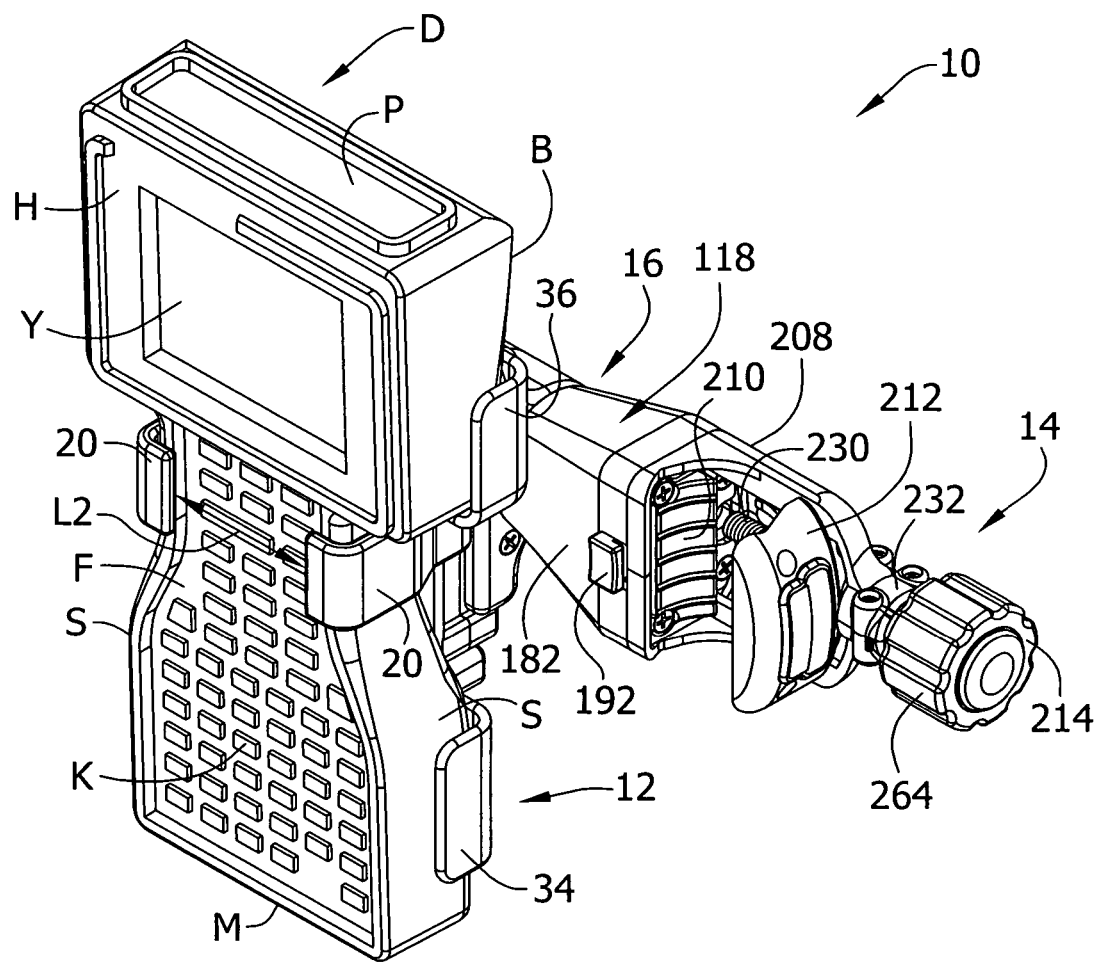
FIG. 4 is a perspective of the mount system supporting the data collector in a hold position.
Figure 5:
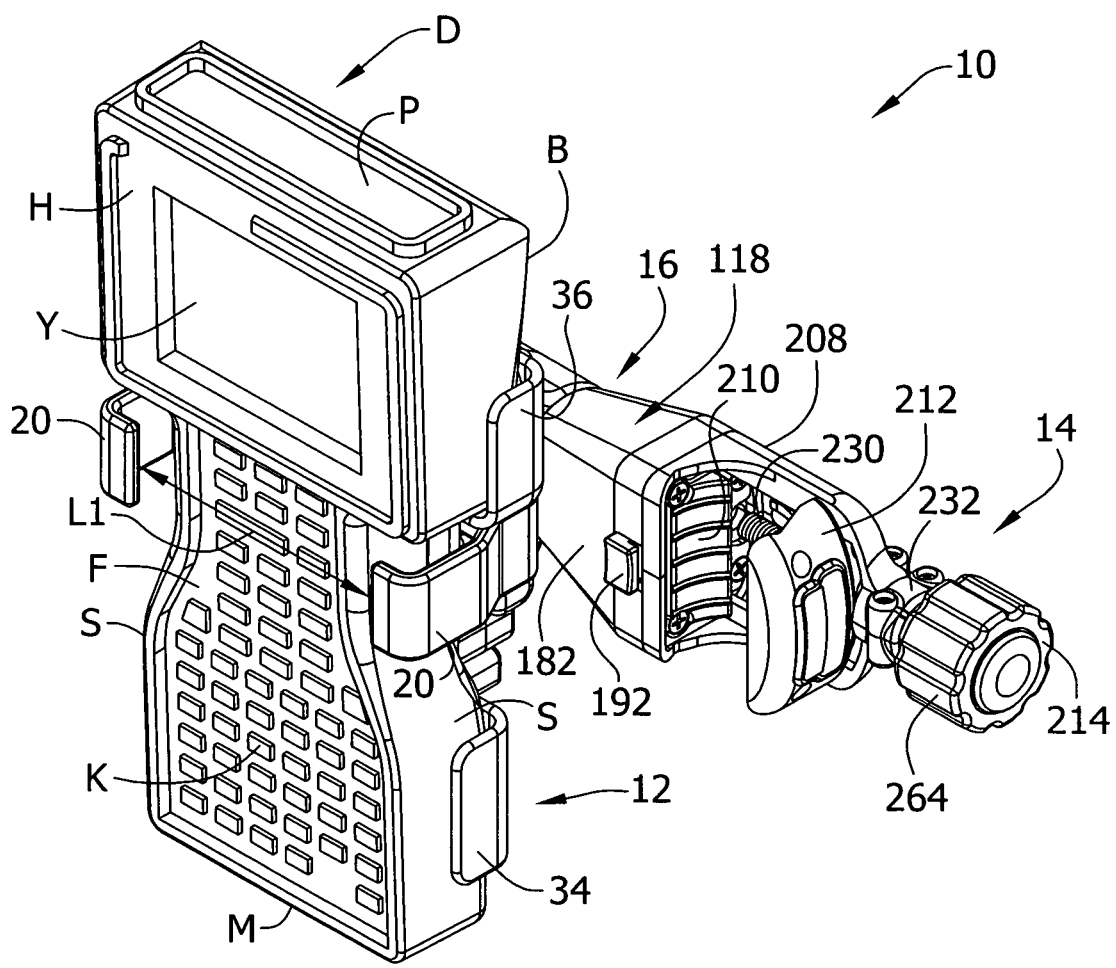
FIG. 5 is a perspective of the mount system supporting the data collector in a release position.
Figure 6:
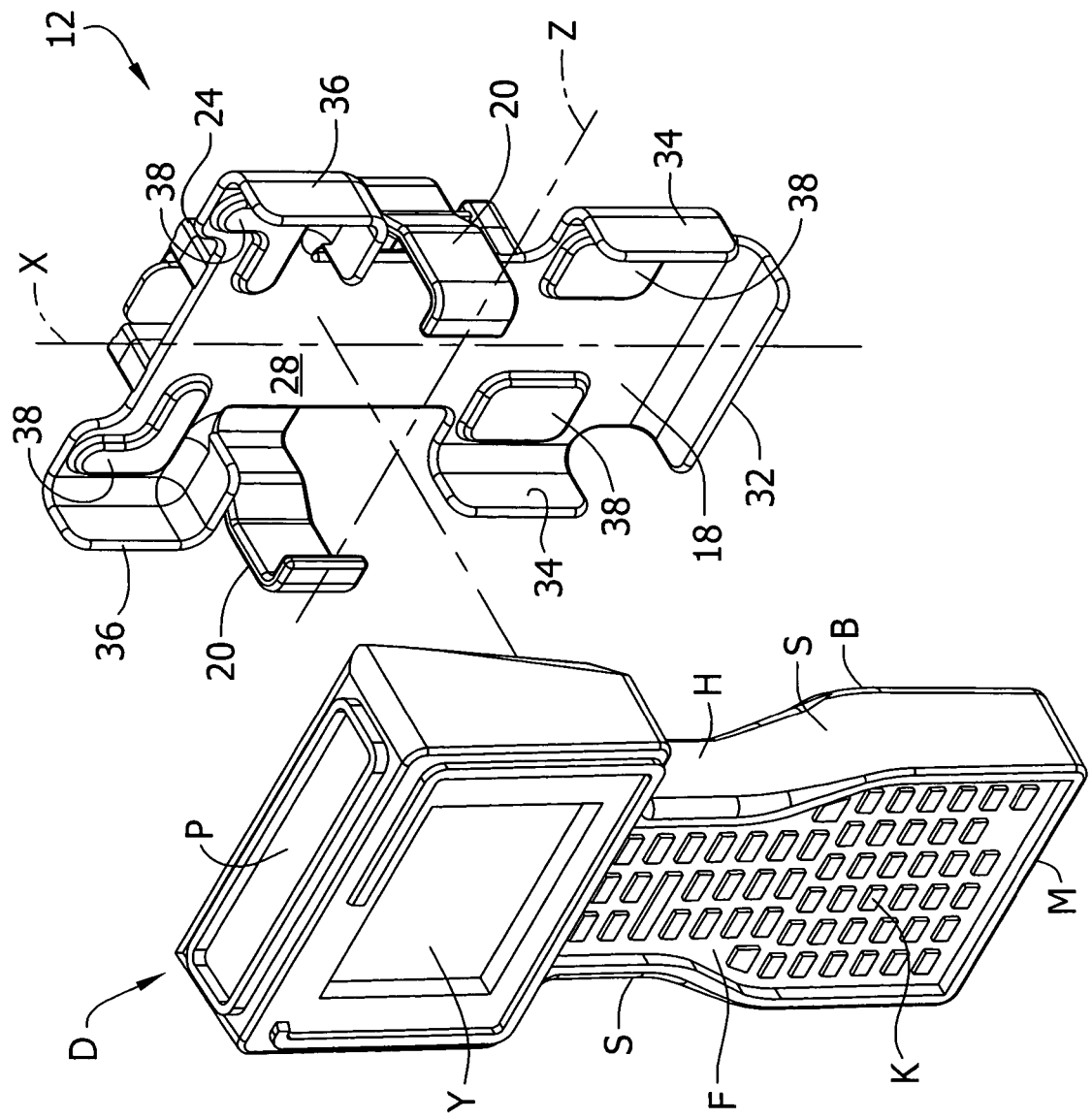
FIG. 6 is a perspective of a cradle of the mount system and the data collector exploded from the cradle.

Referring now to FIGS. 4 and 5, the mount system 10 of the present invention is shown supporting the data collector D. The illustrated data collector D is a handheld computer available from Tripod Data Systems, Inc. of Corvallis, Oreg., U.S.A. under the product name Ranger™. The Ranger™ data collector has a generally hourglass shape to facilitate holding of the data collector in one hand. The data collector has a plastic housing H with a front F, a back B, a bottom M, a top P and two opposed sides S. The front F of the data collector D has a display Y and a keypad K for entering data and commands. The top P of the data collector D is equipped with standard ports (not shown) for connecting the data collector to geomatics equipment, a PC, or a notebook computer. Although the present invention is particularly useful with surveying and geographic positioning equipment, it is not limited to such applications. The invention is envisioned as being useful to support handheld electrical devices having no relation to surveying or geographic positioning. The handheld electrical device can be one other than a data collector, such as a cellular phone, PDA or Blackberry™, and can have configurations other than the one illustrated, such as rectangular or T-shaped. The present invention also has application to non-electrical devices. As used herein, "auxiliary devices" and "auxiliary components" include both electrical and non-electrical devices.

Figure 7:
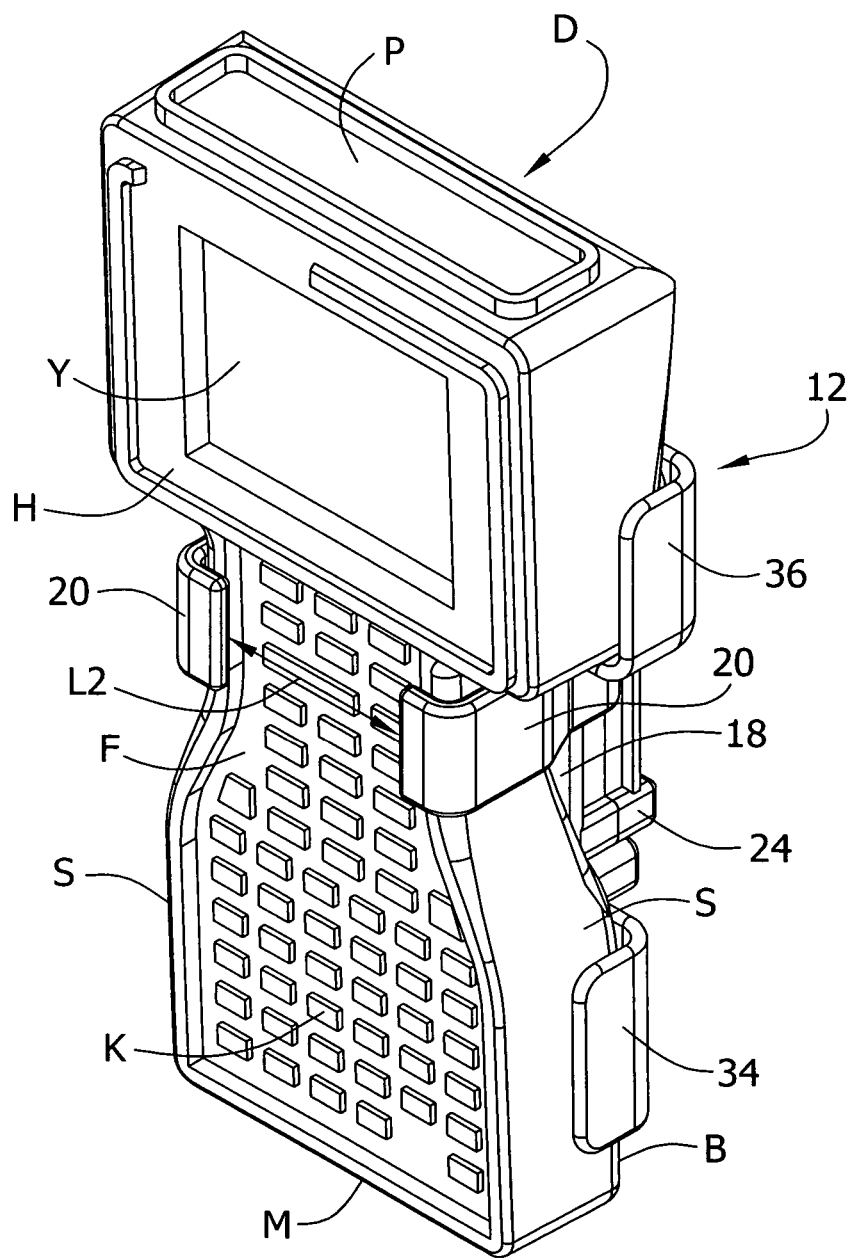
FIG. 7 is a perspective of the cradle supporting the data collector in the hold position.
Figure 8:
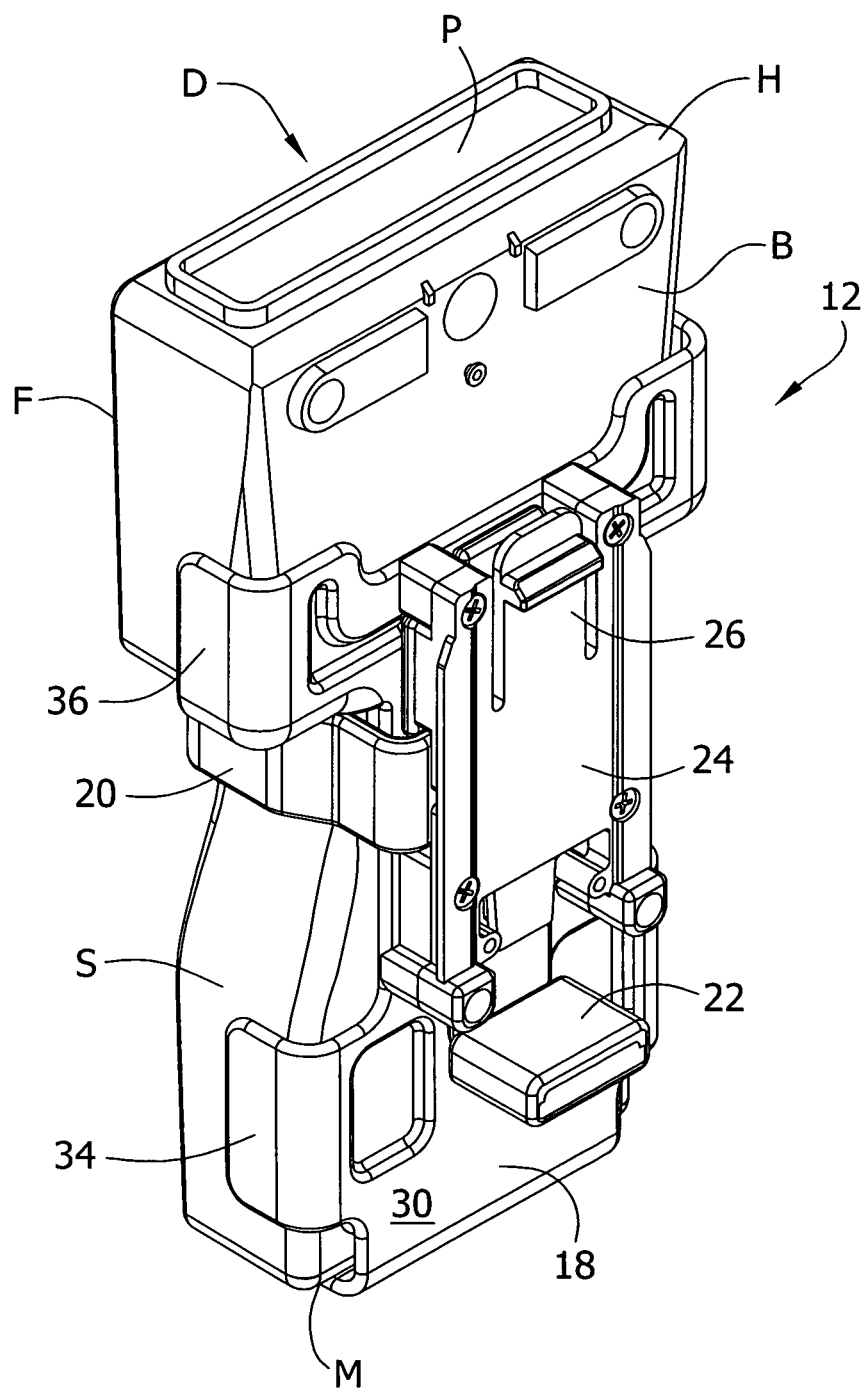
FIG. 8 is a perspective of a back of the cradle and data collector.
Figure 9:
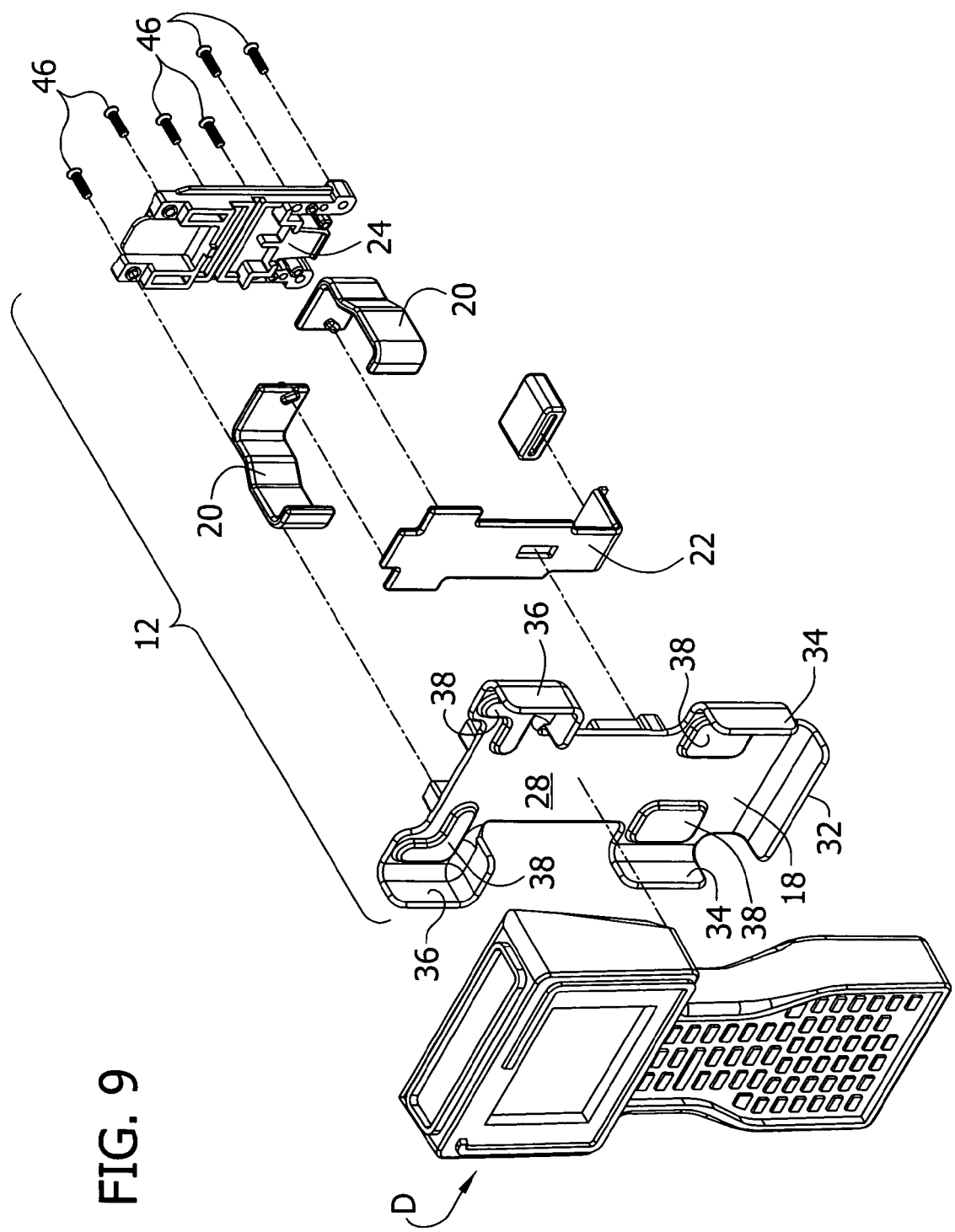
FIG. 9 is an exploded perspective of the cradle showing a base, an actuator, arms, and a back cover of the cradle.

With reference to FIGS. 6-9, the cradle 12 is constructed to support the data collector D and comprises a base 18 for receiving the data collector and a pair of arms 20 disposed with respect to the base and to each other such that the arms are adjacent opposite sides of the data collector when the data collector is placed on the base. The cradle 12 also includes an actuator 22 (FIG. 9) for moving the arms 20 relative to the base 18 between a release position in which the arms are spaced apart a first distance L1 allowing the data collector D to be freely removed from and placed on the base (FIG. 5), and a hold position in which the arms are spaced apart a second distance L2 smaller than the first distance for holding the data collector in the cradle (FIGS. 4 and 7). As shown in FIGS. 8 and 9, the cradle 12 further includes a back cover 24 for maintaining the actuator 22 and the arms 20 in relation with the base 18. In the illustrated embodiment, the back cover 24 also constitutes a second connector element 26, as will be explained hereinafter.

Figure 10:
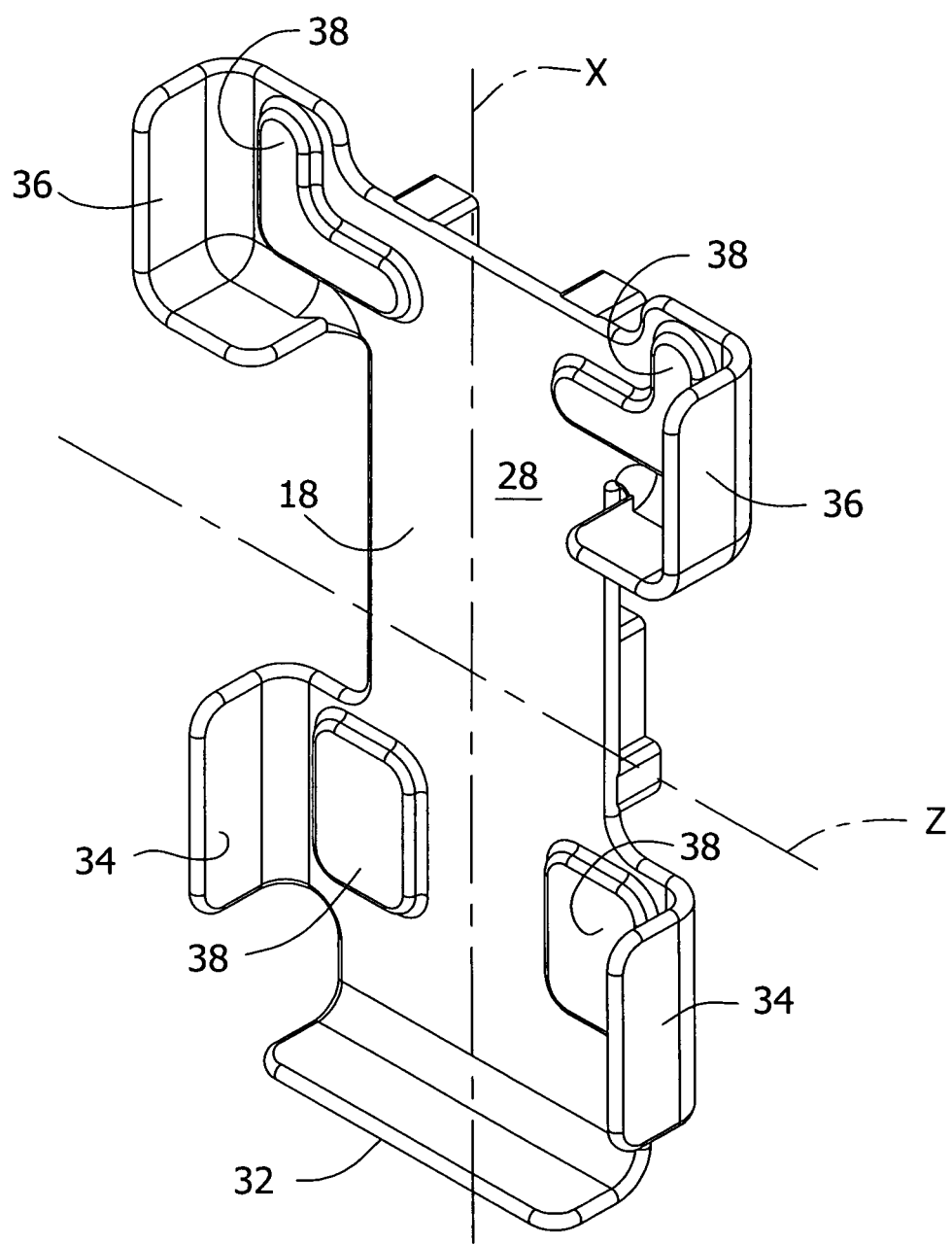
FIG. 10 is a perspective of a front of the base.
Figure 11:
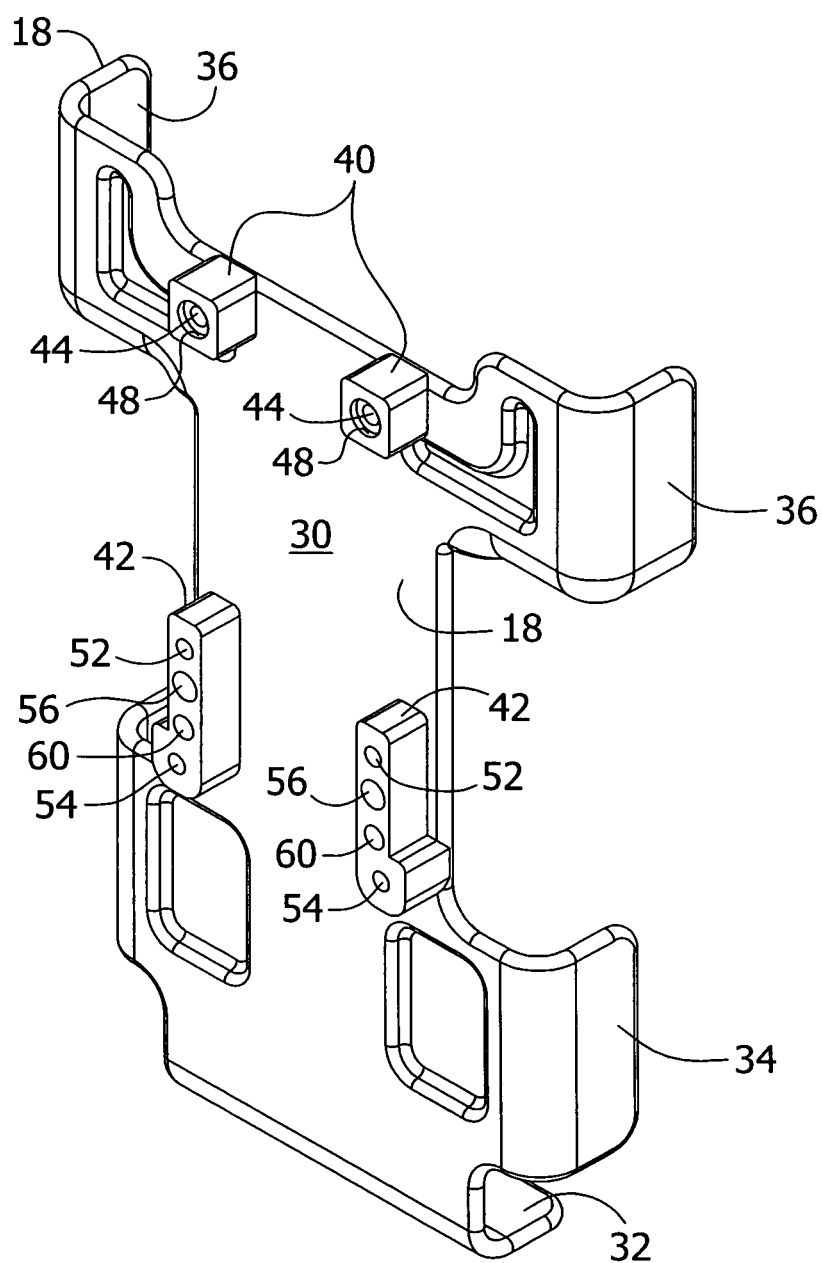
FIG. 11 is a perspective of a back of the base.

Now referring to FIGS. 10 and 11, the base 18 of the cradle 12 has a longitudinal axis X, a transverse axis Z, a front 28, and a back 30. The front 28 of the base 18 includes a peripheral retainer projecting outwardly from the base for supporting the bottom M and sides S of the data collector D to restrain the data collector from lateral movement with respect to the base. The illustrated retainer is discontinuous and comprises a bottom flange 32 and two pair of opposing side flanges 34, 36. One pair of side flanges 34 are generally adjacent the bottom flange 32 and extend generally parallel to the longitudinal axis X of the base 18. The other pair of side flanges 36 are positioned adjacent the top of the base 18 and have generally L-shape configurations. It is understood that the flanges can be continuous or have other arrangements. For example, the bottom flange and the side flanges adjacent thereto could be formed as a single piece.

The front 28 of the base 18 also includes an engagement surface adapted to engage the back of the data collector D when the data collector is placed in the cradle. In the illustrated embodiment, the engagement surface comprises four, spaced apart raised portions 38. Each of the raised portions 38 is proximate to one of the side flanges 34, 36. The raised portions 38 proximate the straight side flanges 34 each have a generally rectangular shape whereas the raised portions adjacent the L-shaped side flanges 36 are also generally L-shaped. The raised portions 38 provide spacing between the majority of the front 28 of the base 18 and the data collector D, which facilitates removal of the data collector from the cradle 12 or placement of the data collector on the cradle.

Figure 15:
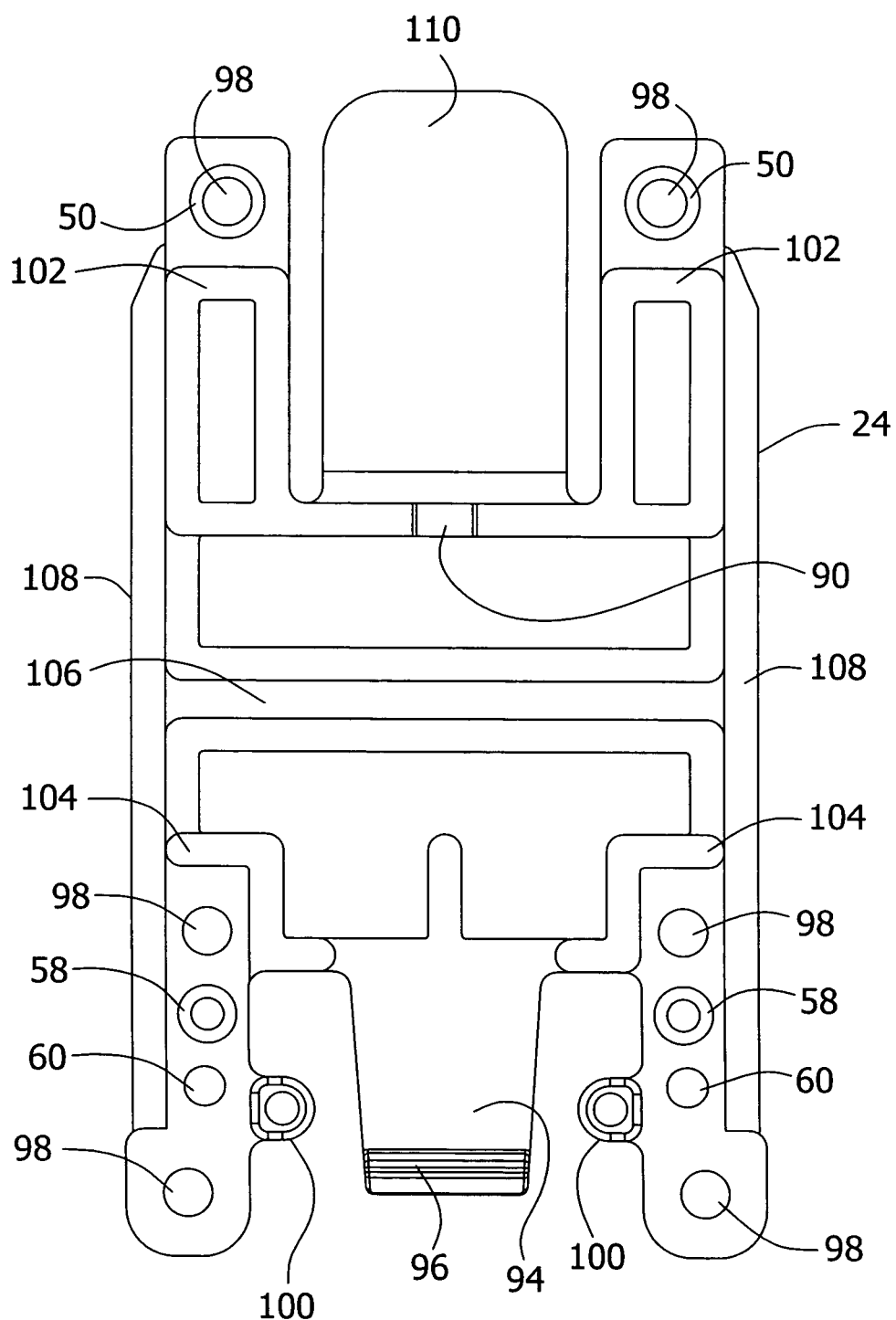
FIG. 15 is a an elevation of a front of the back cover.

The back 30 of the base 18 as shown in FIG. 11 has a pair of upper standoffs 40 and a pair of lower standoffs 42. The upper standoffs 40 are positioned adjacent the top of the base 18 and have fastener holes 44 therein for receiving fasteners 46 (FIG. 9), such as screws, for securing the back cover 24 to the base. Referring again to FIG. 11, surrounding each fastener hole 44 in the upper standoffs 40 is an annular recess portion 48 (like a counterbore) for aligning with and receiving a first pair of alignment tabs 50 located on the back cover (FIG. 15). With reference again to FIG. 11, the lower standoffs 42 are located adjacent opposite sides of the base 18 at approximately the longitudinal center of the base. The lower standoffs 42 are elongate and have four apertures therein. Two of the apertures (i.e., the upper aperture 52 and the lower aperture 54) on each of the lower standoffs 42 are for receiving fasteners 46 (e.g., screws) for securing the back cover 24 to the base. Another one of the apertures 56 in the lower standoffs 42 is for receiving one of a second pair of alignment tabs 58 positioned on the back cover 24 for aligning the back cover with the base 18 (FIG. 15). The final aperture 60 is just for material reduction purposes.

Figure 12A:
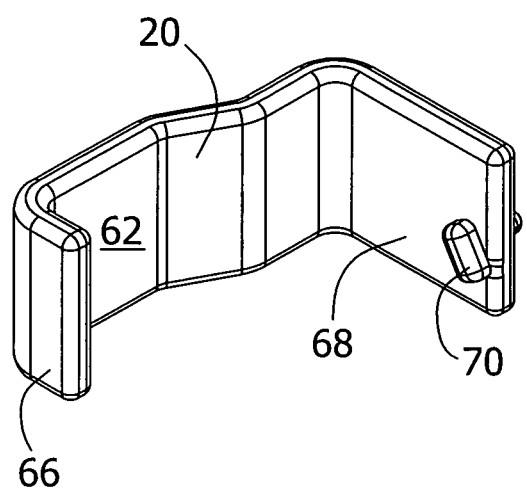
FIG. 12A is a perspective of one of the arms of the cradle showing an inner surface.
Figure 12B:
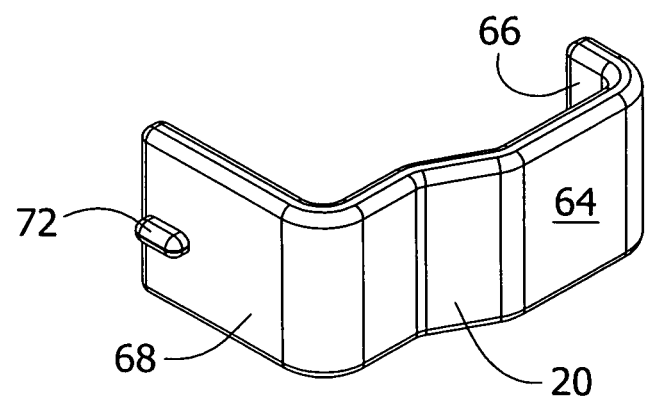
FIG. 12B is a perspective of one of the arms showing an outer surface.

With reference to FIGS. 12A and 12B, each of the arms 20 has an inner surface 62, an outer surface 64, a finger 66 extending outwardly from one end of the arm and a slide portion 68 at the opposite end of the arm. The arms 20 are mirror images of each other and therefore only one of the arms will be described. The arm 20 is contoured to match the shape and size of the respective side S of the data collector D to which it is designed to engage. As illustrated, the slide portion 68 has a protuberance 70, 72 located on each of the inner and outer surfaces 62, 64. The protuberance 70 located on the inner surface 62 is adapted to slidingly engage the actuator 22, and the protuberance 72 located on the outer surface 64 is adapted to slidingly engage back cover 24. The protuberance 72 on the outer surface 64 extends parallel to a longitudinal plane of the finger 66 (FIG. 12B). The protuberance 70 on the inner surface 62, however, is disposed at an angle with respect to a longitudinal plane of the finger (FIG. 12A). The protuberances 70, 72 and their interactions with actuator 22 and back cover 24 are described in further detail below.

The arms 20 of the cradle 12 are shaped and arranged so that in the release position neither of the fingers 66 is located in opposed relation with the front F or back B of the data collector D (FIG. 5), and in the hold position the fingers 66 are disposed in a position opposite to the front of the data collector (FIG. 4). As shown, the fingers 66 each project toward the finger of the opposite arm 20 and are adapted to extend over and engage the front of the data collector D when the cradle 12 is in its hold position to firmly hold the data collector in the cradle. Thus, the data collector D, when properly placed in the cradle 12, can be supported by the cradle at any position including upside down without the data collector falling from the cradle. As a result, the location of a geomatics support with the cradle 12 mounted thereto can be changed with the data collector D placed in the cradle without the data collector falling from the cradle and being damaged. The arms 20 may release hold of the data collector D so that it can be removed and replaced from the cradle 12 without disturbing the geomatics support.

Figure 13:
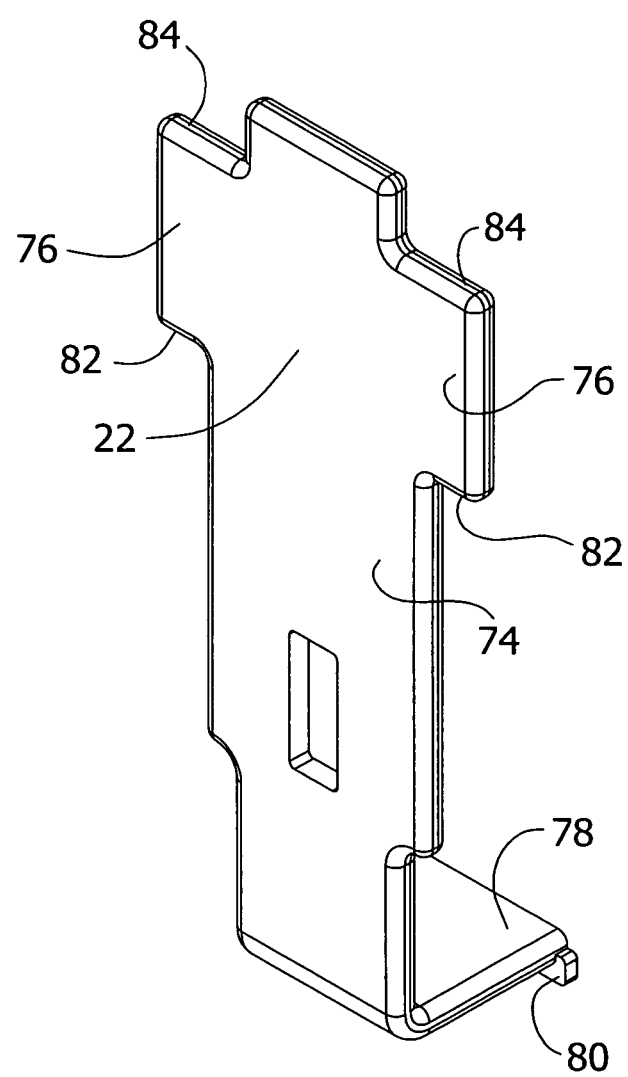
FIG. 13 is a perspective of a front of the actuator.
Figure 14:
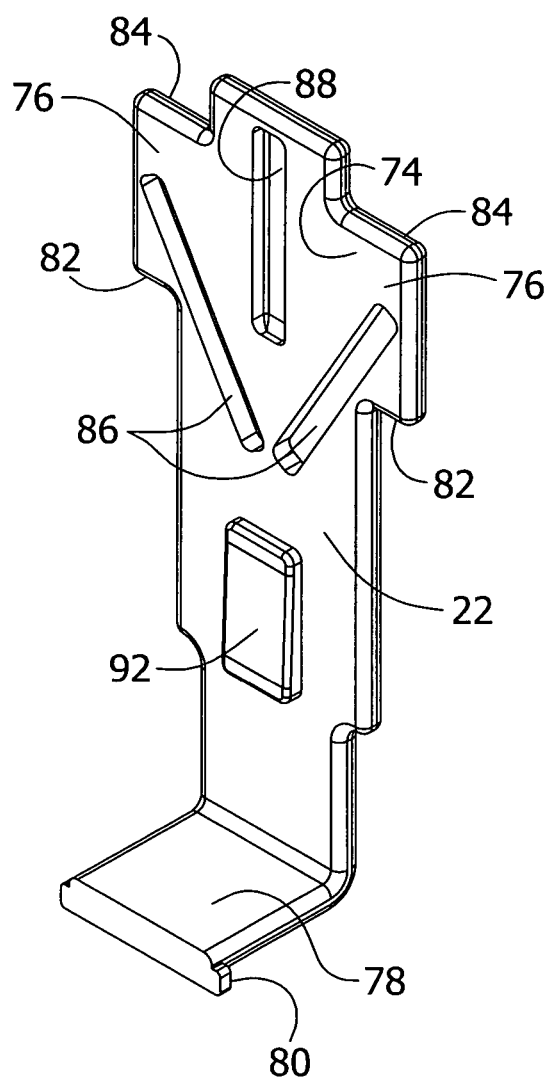
FIG. 14 is a perspective of a back of the actuator.

Referring now to FIGS. 13 and 14, the actuator 22 of the cradle 12 comprises a generally cruciform plate 74 adapted to move longitudinally with respect to the base 18 to move the arms 20 between the hold and release positions. The cruciform plate 74 has ears 76 projecting laterally from opposite sides of the plate. The portion of the plate 74 above the opposing ears 76 is slightly narrower than the portion of the plate below the ears. The actuator 22 further comprises a handle 78 attached to the plate 74 for facilitating moving the plate. The handle 78 is formed as a one-piece unit with the plate 74 and extends outwardly from the plate to a position where the handle can be easily gripped. A free end of the handle 78 is formed with a lip 80 to increase the ability of the handle to be gripped.

The front of the plate 74 is adapted for being placed in face-to-face relation with the back 30 of the base 18 such that the portion of the plate below the ears 76 is disposed between the pair of lower standoffs 42 (see, FIG. 17). The front of the plate 74 and the back 30 of the base 18 have generally flat, smooth engaging surfaces for allowing the plate to slide along the longitudinal axis X of the base from an extended position and a retracted position. In the extended position, a lower lateral edge 82 of each of the plate ears 76 contacts and is stopped by the pair of lower standoffs 42 on the base 18 (see, FIG. 18). Positioning the plate 74 in its extended position moves the arms 20 to their release position as explained in greater detail below. In the retracted position, an upper lateral edge 84 of each of the plate ears 76 contacts and is stopped by the pair of upper standoffs 40 on the base 18. The portion of the plate 74 above the ears 76 is disposed between the upper standoffs 40 in this position. The portion of the plate 74 below the ears 76 remains between the pair of lower standoffs 42. The lower standoffs 42 also provide a longitudinal guide for moving the plate 74 between its retracted and extended positions. Positioning the plate 74 in its retracted position, moves the arms 20 to their hold position, as is also explained in greater detail below.

The back of the plate 74 as shown in FIG. 14 has three channels therein. Two of the channels 86 are sized and shaped for receiving the protuberances 70 on the inner surfaces 62 of the arms 20 (FIG. 12A). The channels 86 are angled with respect to a longitudinal plane of the plate such that as the plate 74 is moved longitudinally with respect to the base 18 between its extended and retracted positions, the protuberances 70 of the arms 20 slide in the channels causing the arms to move laterally with respect to the base between their hold and release positions (FIG. 14). The third channel 88 is positioned near the top edge of the plate 74 and is adapted for receiving a projection 90 positioned on the back cover 24 (FIG. 15). The third channel 88 in the back of the plate 74 and the projection 90 on the back cover 24 provide an alignment guide for the plate as the plate is move between the extended and retracted positions. The projection 90 in combination with the back cover 24 secure the actuator 22 to the base 18.

Referring still to FIGS. 14 and 15, a wedge 92 on the back of the plate 74 cooperates with a resilient lower clasp 94 on the back cover 24 to releasably hold the plate in both the extended and retracted positions corresponding to the release position and hold position, respectively, of the arms 20. During movement of the plate 74 from its extended position to its retracted position, the clasp 94 slides up an inclined top surface of the wedge 92 until a lip 96 on the clasp extends past the surface of the wedge. At this point, the clasp 94 snaps downward such that the lip 96 extends below the top surface of the wedge 92 thereby holding the plate 74 in the retracted position. To move the plate 74 from the retracted position to extended position, the plate is pulled (slid axially downward) with sufficient force to cause the clasp 94 to deflect upward thereby releasing the lip 96 from the wedge 92. The plate 74 can be moved until the lip 96 passes off of the top surface of the wedge 92 and is positioned on the opposite side of the wedge thereby to hold the plate in the extended position.

Figure 16:
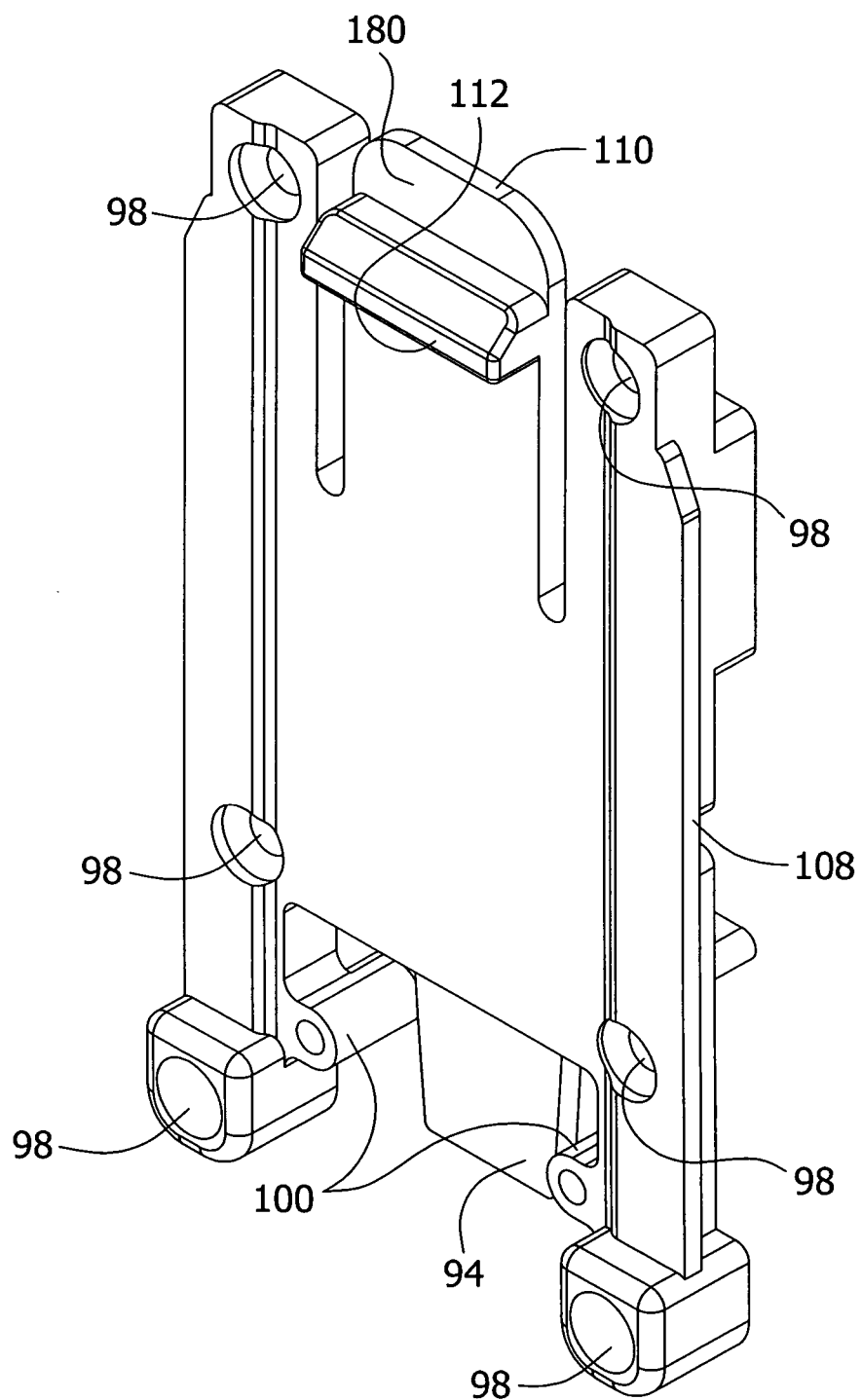
FIG. 16 is a perspective of a back of the back cover.

Referring now to FIGS. 15 and 16, the back cover 24 of the cradle 12, which maintains the actuator 22 and the arms 20 in relation with the base 18 of the cradle, is shown. As stated previously, the back cover 24 is fastened to the back 30 of the base 18 using fasteners 46 (FIG. 9). Accordingly, the back cover 24 has six countersunk fastening holes 98 for receiving fasteners 46 (FIG. 16). Two of the fastening holes 98 align with the fastening holes 44 in the upper standoffs 40 of the base 18 and the other four fastening holes 98 align with the fastening holes 52, 54 in the lower standoffs 42 of the base (see FIGS. 11 and 15). The back cover 24 also has six alignment tabs for aligning the back cover with the base 18. As described above, first and second pairs of alignment tabs 50, 58 align with and engage the upper and lower standoffs 40, 42 of the base 18, respectively. A third pair of alignment tabs 100 align with and engage interior sides of the lower standoffs 42 of the base 18. The third pair of alignment tabs 100 not only align the base 18 and the back cover 24 but also provide a guide to the plate 74 of the actuator 22 to inhibit the actuator from tilting away from the base and to thereby maintain the plate in face-to-face relationship with the back 30 of the base. Moreover, the back cover 24 also has two alignment portions 102, 104 for aligning with the upper and lower standoffs 40, 42 on the base 18, respectively. The tabs 50, 58 and standoffs 40, 42 operate to form a space between the base 18 and the back cover 24 in which portions of the arms 20 and actuator 22 are slidably received. The back cover 24 also includes a laterally extending groove 106 (FIG. 15) for receiving the protuberances 72 on the outer surfaces 64 of the arms 20 (FIG. 12B).

The groove 106 and projections 72 cooperate to mount the arms 20 on the cradle 12 and inhibit movement of the arms longitudinally with respect to the actuator 22 as the arms are moved between their hold and release positions. Thus, as the actuator 22 is moved between its extended and retracted positions, the protuberances 70 on the inner surface 70 of the arms 20 slid within the angled channels 86 in the plate 74 of the actuator thereby moving the arms laterally away from or toward the longitudinal axis X of the base 18 (FIGS. 17 and 18). In addition, the protuberances 72 on the outer surface 64 of the arms 20 slide with the groove 106 in the back cover 24 which maintains the longitudinal position of the arms with respect to the base 18.

Figure 19:
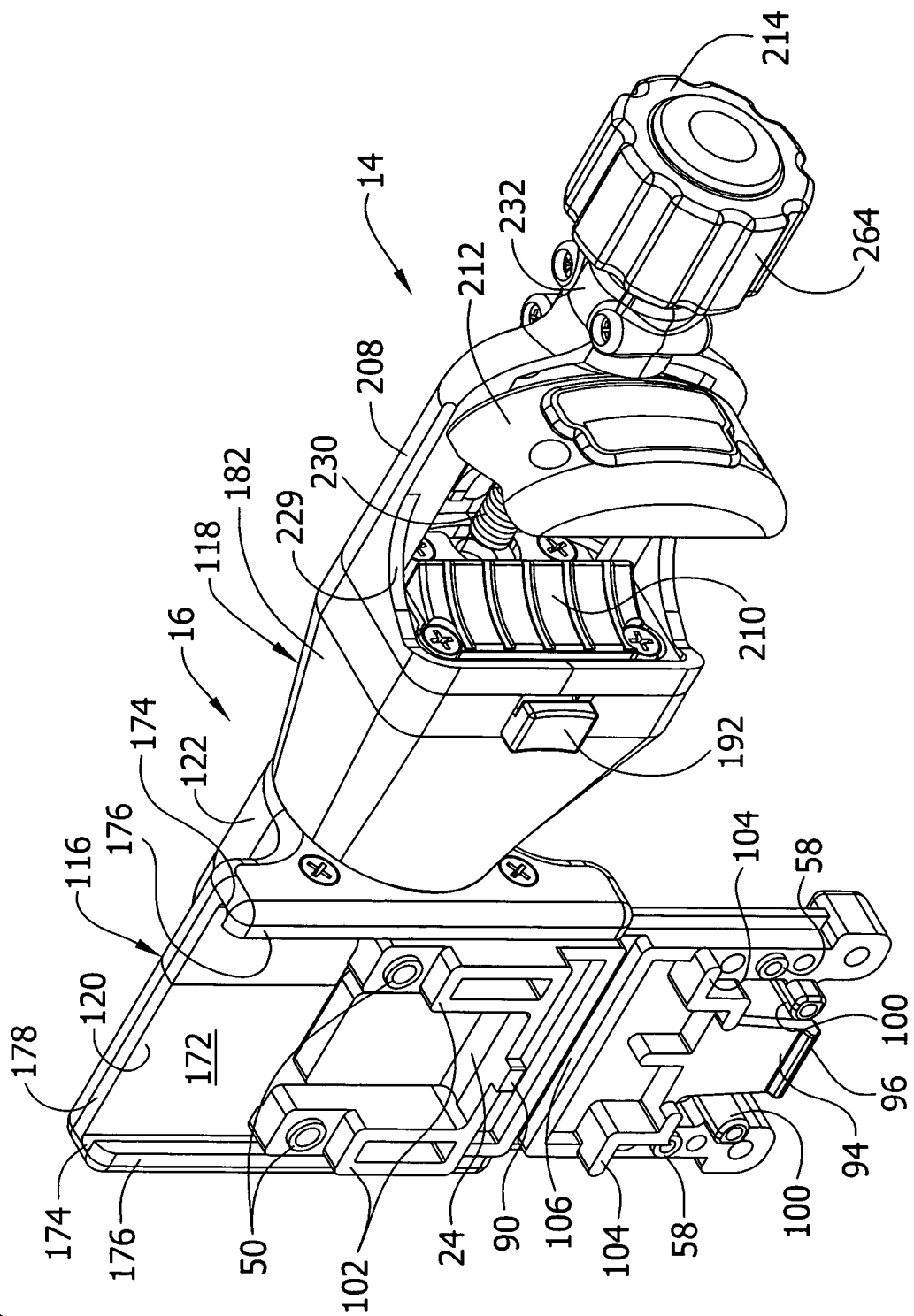
FIG. 19 is a perspective of the back cover of the cradle partially slid into a male component of a coupler of the mount system.

As shown in FIGS. 15 and 16, the back cover 24 also includes shoulders 108 extending longitudinally along the peripheral edges of the back cover. In addition, the back cover 24 has an upper clasp 110 with a lip 112 capable of resilient deflection similar to the lower clasp 94 described above. These features of the back cover 24 (or "second connector element") allow the cradle 12 to connect to a first connector element of the coupler 16, as illustrated in FIG. 19 and described in more detail below.

Figure 17:
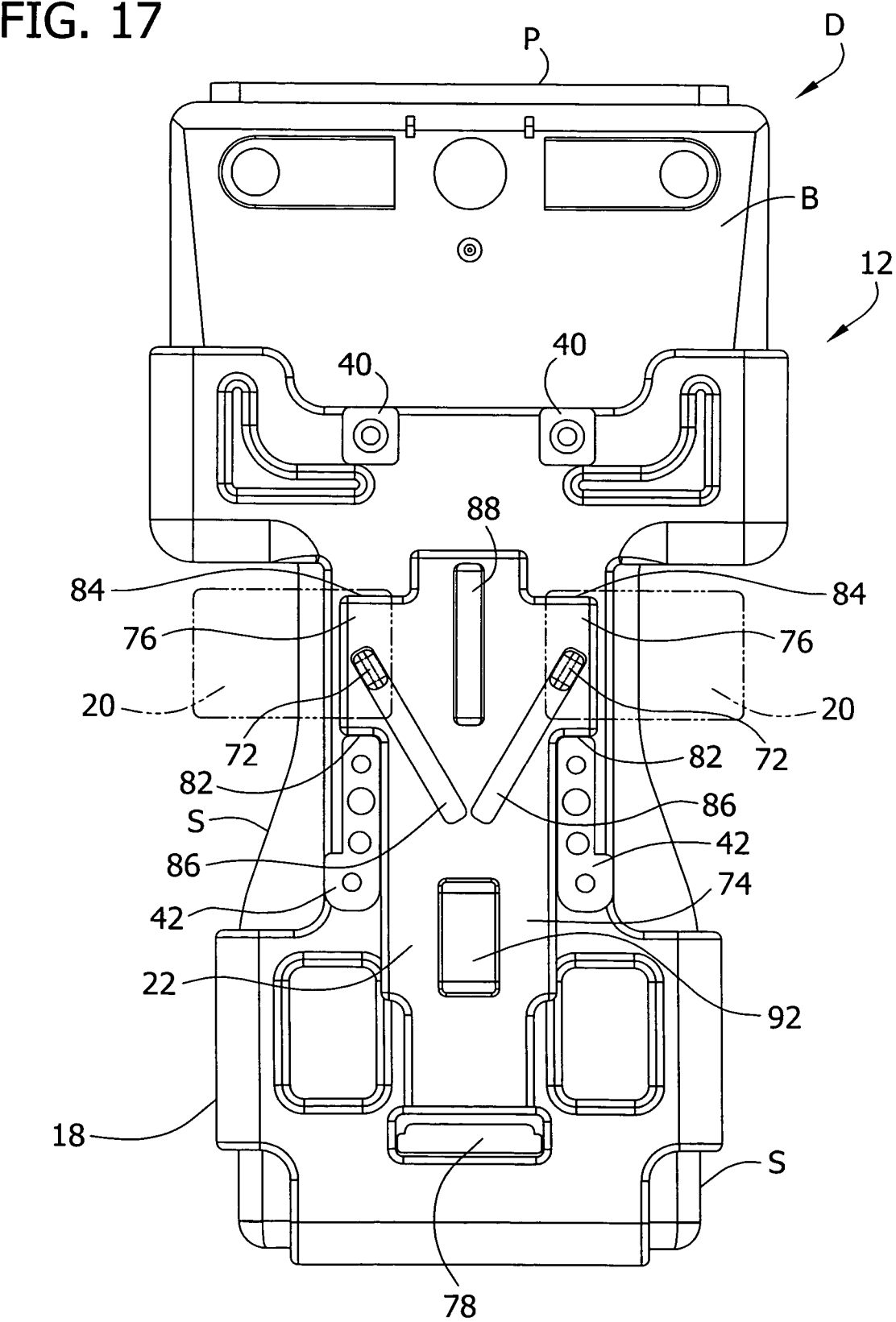
FIG. 17 is an elevation of the cradle holding the data collector with the back cover removed and the arms shown in phantom in the release position.
Figure 18:
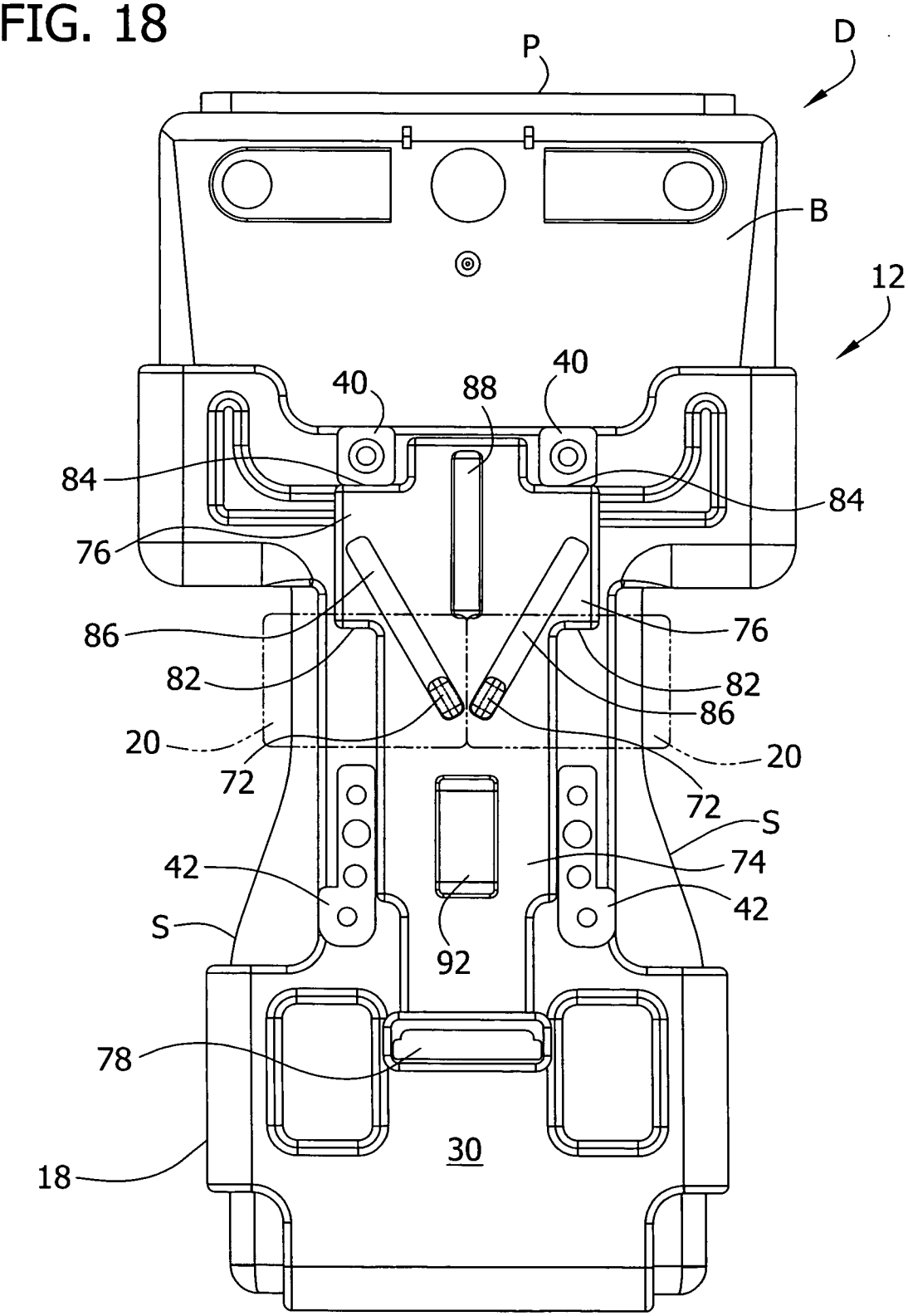
FIG. 18 is an elevation similar to FIG. 17 with the arms shown in phantom in the hold position.

In use, movement of the actuator 22 of the cradle 12 causes the arms 20 to move in a direction generally orthogonal to the movement of the actuator thereby to move the arms between the release and hold positions (FIGS. 17 and 18). Since the actuator 22 is movable linearly along the longitudinal axis X of the base 18, the arms 20 move in directions that are transverse to the base. As a result, pushing the actuator 22 upward with respect to the longitudinal axis X of the base 18 causes the arms 20 move closer together (FIG. 18) and pulling the actuator downward with respect to the longitudinal axis of the base causes the arms to move apart (FIG. 17). Because the actuator 22 is easy to use, the data collector D can be placed on or removed from the cradle 12 while the cradle is mounted to a geomatics pole G or tripod T without compromising the positioning of the pole or tripod. Moreover, the actuator 22 can be moved between its extended and retracted positions using only one hand.

Figure 20:
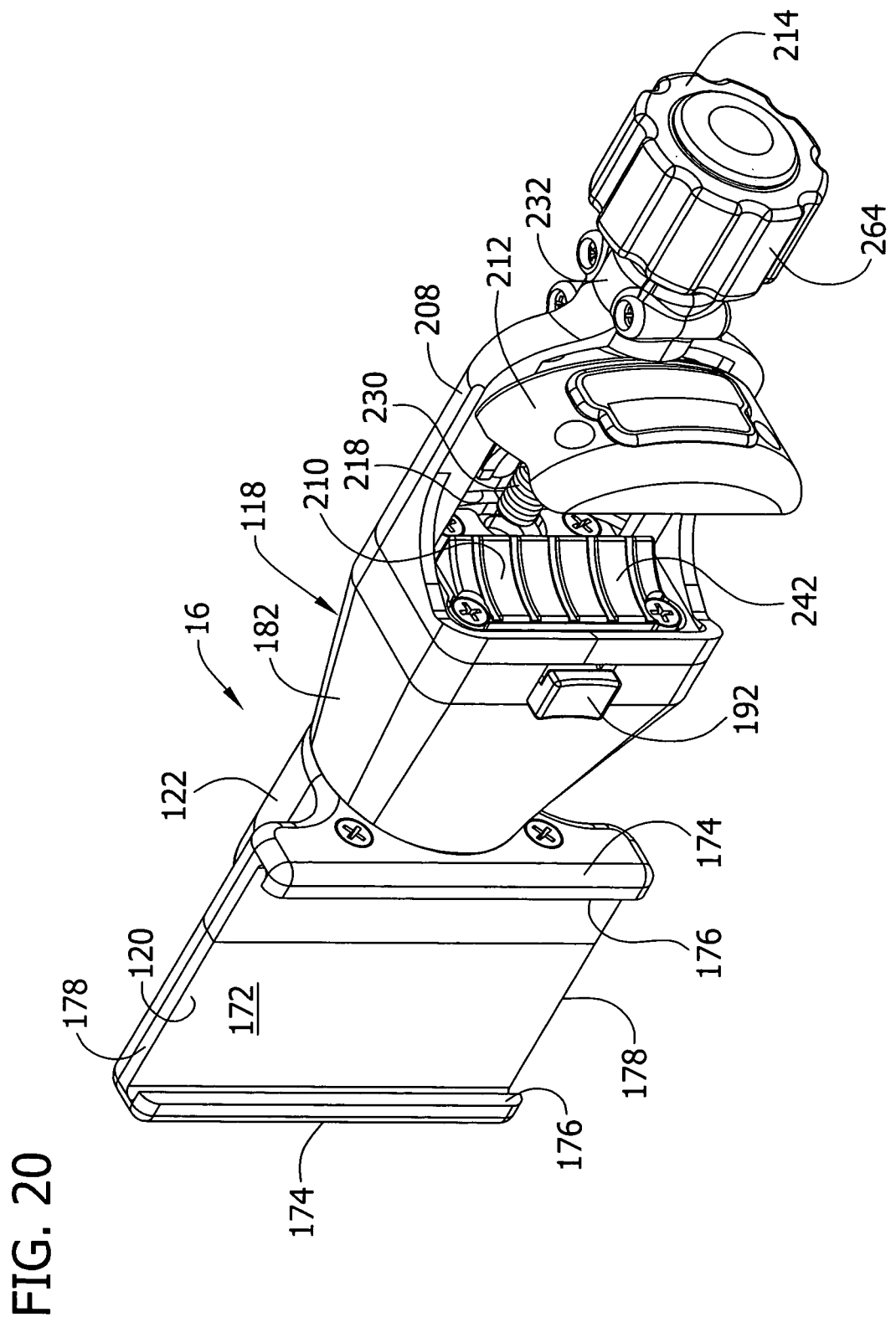
FIG. 20 is a perspective of the coupler and a clamp of the mount system.
Figure 21:
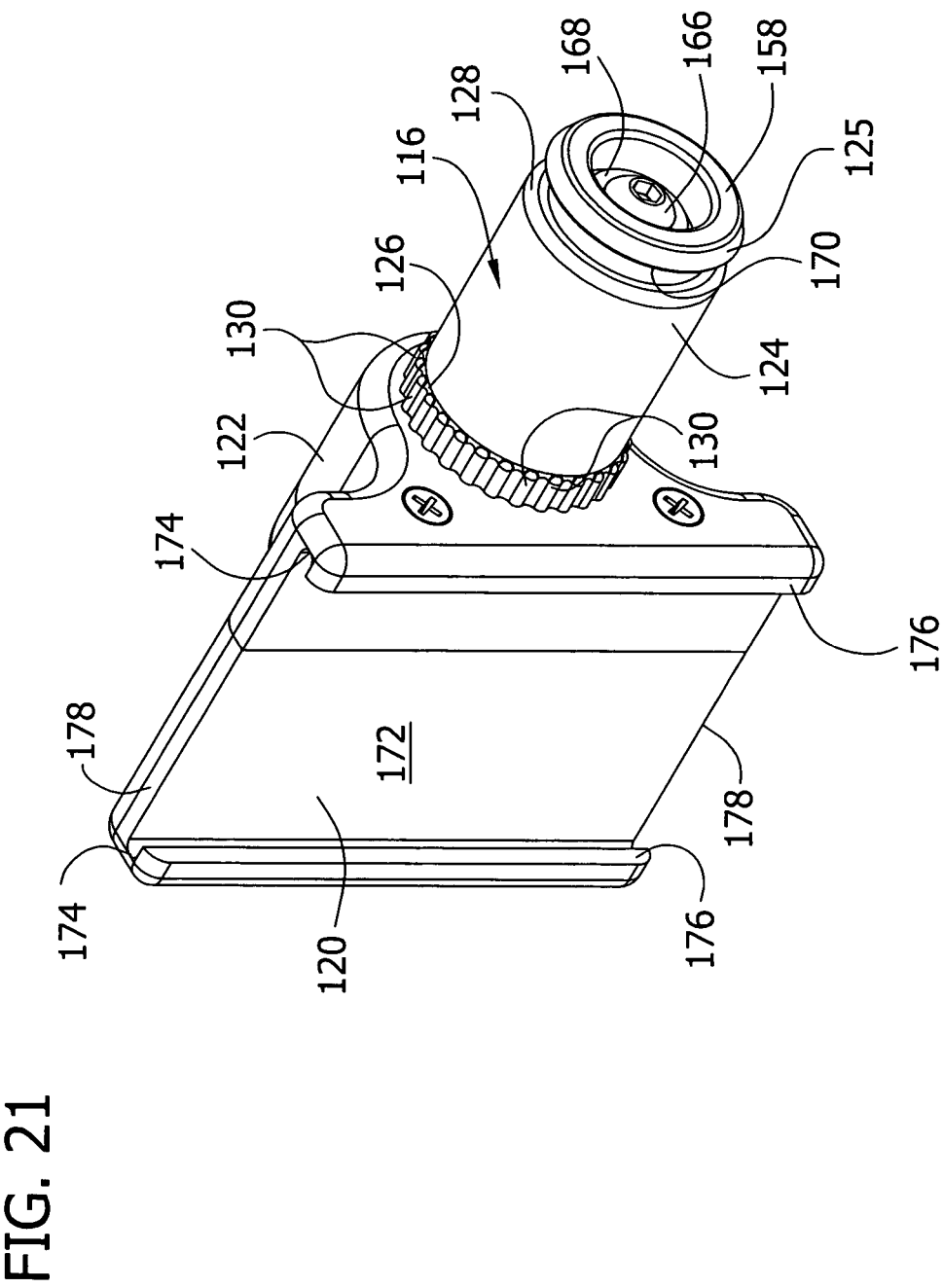
FIG. 21 is a perspective of the male component of the coupler.
Figure 22:
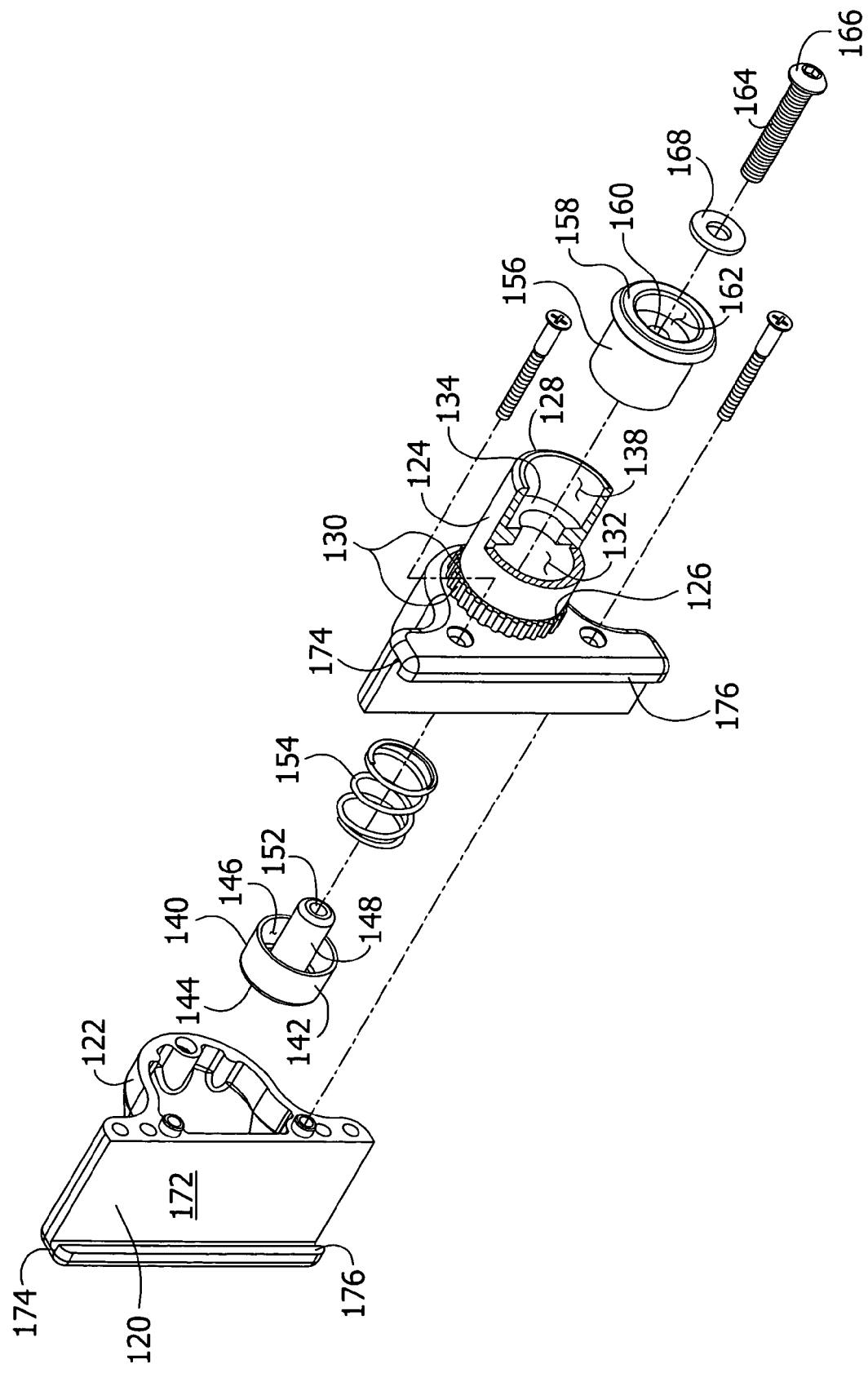
FIG. 22 is an exploded perspective of the male component with a portion of a shaft of the male component being broken away to show an internal ring.
Figure 23:
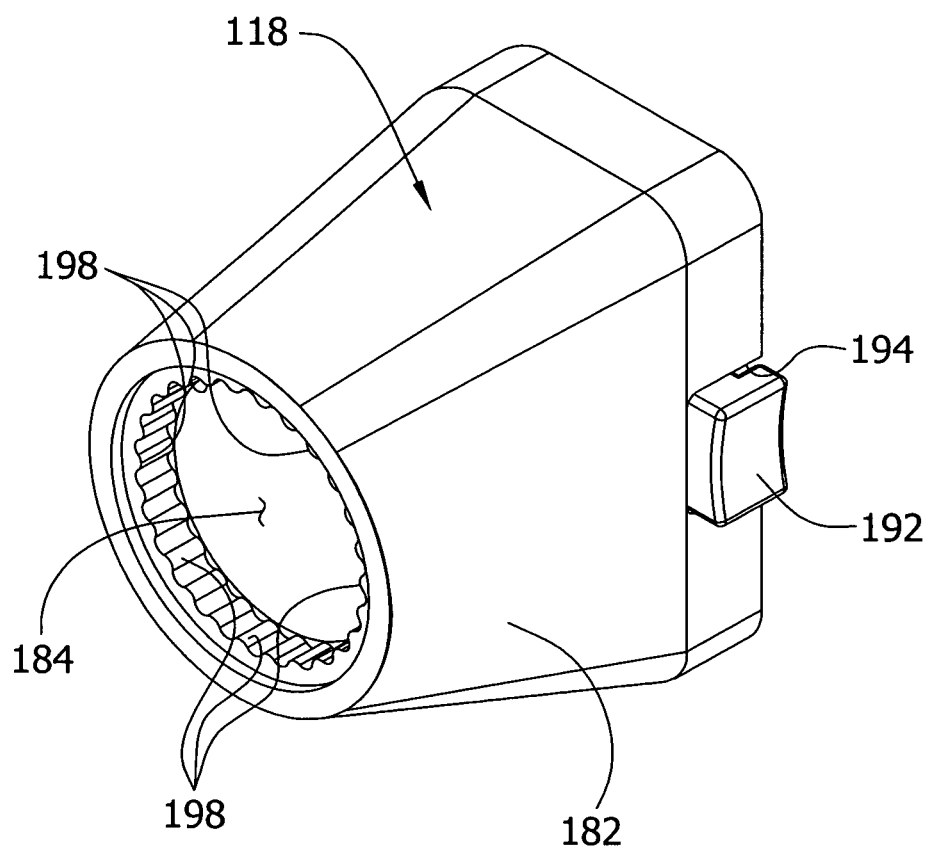
FIG. 23 is a perspective of a female component showing an interior chamber.

With reference to FIGS. 20-22, the coupler 16, which attaches the cradle 12 to the clamp 14, comprises a male component, indicated at 116, and a female component, indicated at 118. The male component 116 as shown in FIGS. 19 and 20 includes a shallow channel 120 (broadly, "a first connector element") and a housing 122 formed on one side of the channel. A cylindrical stem 124 having first and second ends 126, 128 extends outwardly from the housing 122 (FIG. 21). The first end 126 of the stem 124 is connected to the housing 122 and has a plurality of detents 130 in spaced relation positioned around the circumference of the stem. A passage 132 extends through the stem 124 from the first end 126 to the second end 128 (FIG. 22). The passage 132 is divided by an interior ring 134 into an inward portion 136 and an outward portion 138 (see, FIG. 26B). The stem 124 illustrated in FIG. 22 is partially broken away to show the interior ring 134. A plug 140 includes a cylinder 142 having a closed end 144, an open end 146, and a post 148 affixed to the closed end. The post 148 of the plug 140 extends out of the cylinder 142 and has a free end with a centrally positioned fastener hole 152. The plug 140 is positioned in the inward portion 136 of the passage 132. A spring 154 is received in the cylinder 142 around the post 148 and engages the interior ring 134 to bias the plug in a direction away from the interior ring. A double walled sleeve 156 having a peripheral rim 158 at one end is adapted for being received in the outward portion 138 of the passage 132. The sleeve 156 has a passageway 160 and a countersink 162 for receiving a fastener 164 for connecting the sleeve to the post 148 so that the plug 140 and sleeve move conjointly. The fastener 164 extends through the sleeve 156, the interior ring 134 in the stem passage 132, and into the fastening hole 152 in the post 148. A head 166 of the fastener 166 and a washer 168 are fully received in the countersink 162. The rim 158 of the sleeve 156 is axially spaced from the second end 128 of the stem 124 such that an annular groove 170 is formed by the sleeve 156 and the stem 124. The portions of the male component 116 extending outwardly from the housing 122 are collectively referred to herein as a shaft.

The channel 120 (or first connector element) of the male component 116 has a web 172 and first and second side walls 174 at opposite sides of the web. As shown in FIG. 21, the first and second side walls 174 each have an in-turned lip 176 at its free edge extending generally toward the other sidewall and lip, and generally parallel to the web 142. The back cover 24 (second connector element) of the cradle 12 and the channel 120 (first connector element) of the coupler 16 collectively form a connector in the illustrated embodiment. As shown in FIG. 20, the channel 120 further including open ends 178. The channel 120 is shaped and arranged so that the shoulders 108 of the back cover 24 may be inserted into the channel through either open end 178 of the channel (see, FIG. 19). The upper clasp 110 of the back cover 24 is adapted to snap over an edge of the channel 120 and thereby secure the male coupler 116 to the cradle 12 no matter which way the back cover 24 is inserted into the channel 120.

Because of the two ways in which the male component 116 of the coupler 16 can be attached to the back cover 24 of the cradle 12, the cradle can be positioned on either side of the surveying equipment to facilitate use of the geomatics support and data collector D by either a left-handed (FIG. 2) or right-handed user (FIG. 3). The cradle 12 can support the data collector D in an upright, forward facing position no matter which way it extends from the geomatics support. To release the male component 116 from the back cover 24 of the cradle 12, a thumb tab 180 on the upper clasp 110 of the back cover allows the lip 112 to be moved to a position free of engagement with the channel 120 (FIG. 16). Once the lip 112 is clear of the channel 120, the back cover 24 can be slid out of the male component 116. Thus, it is relatively easy to change the cradle 12 from a right-handed set up to a left-handed set up or vice versa.

Figure 24A:
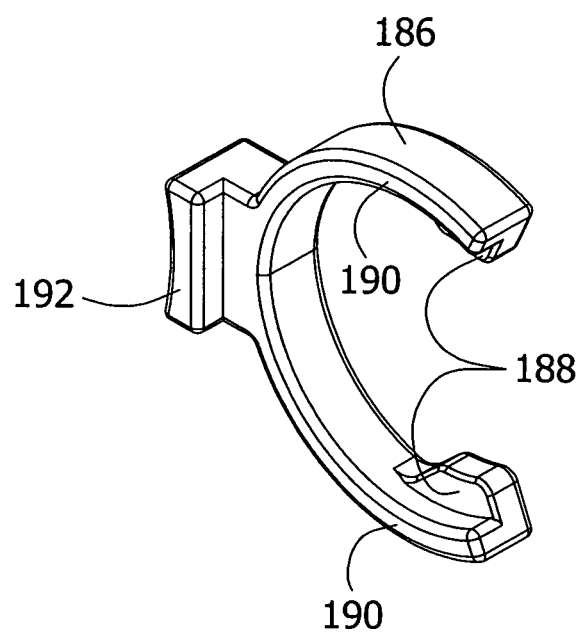
FIG. 24A is a perspective of a catch of the female component.
Figure 24B:
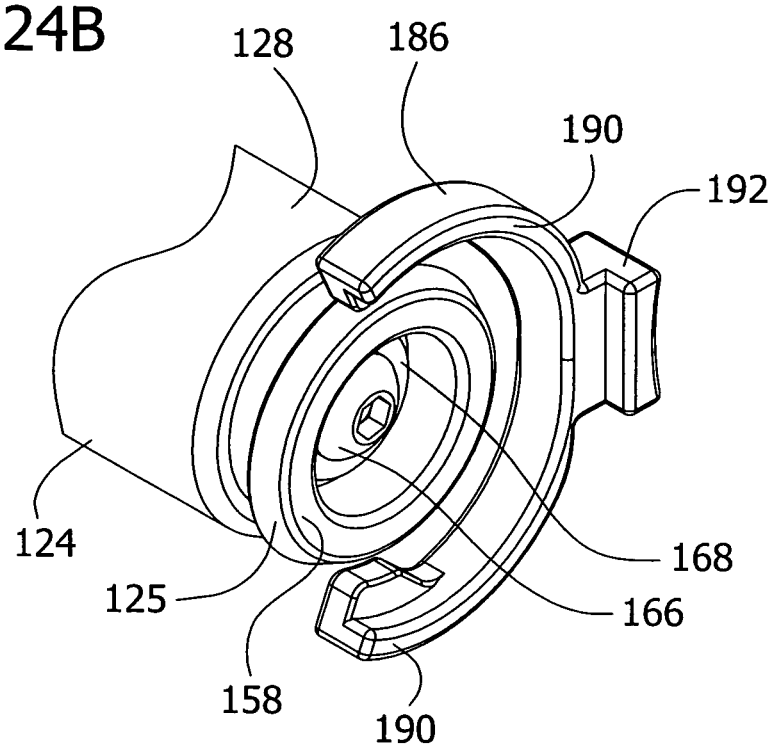
FIG. 24B is a perspective of the catch sliding over a beveled edge of the male component with a portion of the male component being broken away.
Figure 24C:
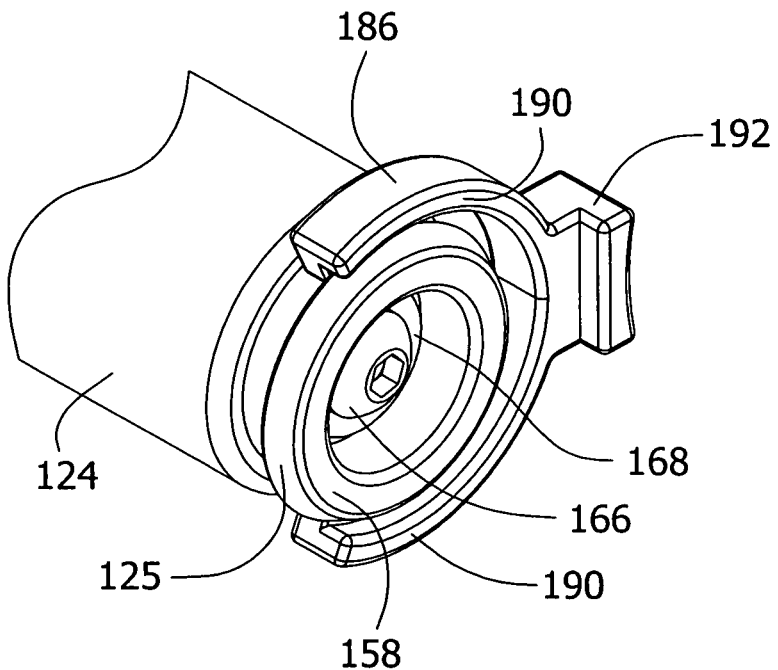
FIG. 24C is a perspective similar to FIG. 24B except that the catch is engaged with a groove in the male component.
Figure 25A:
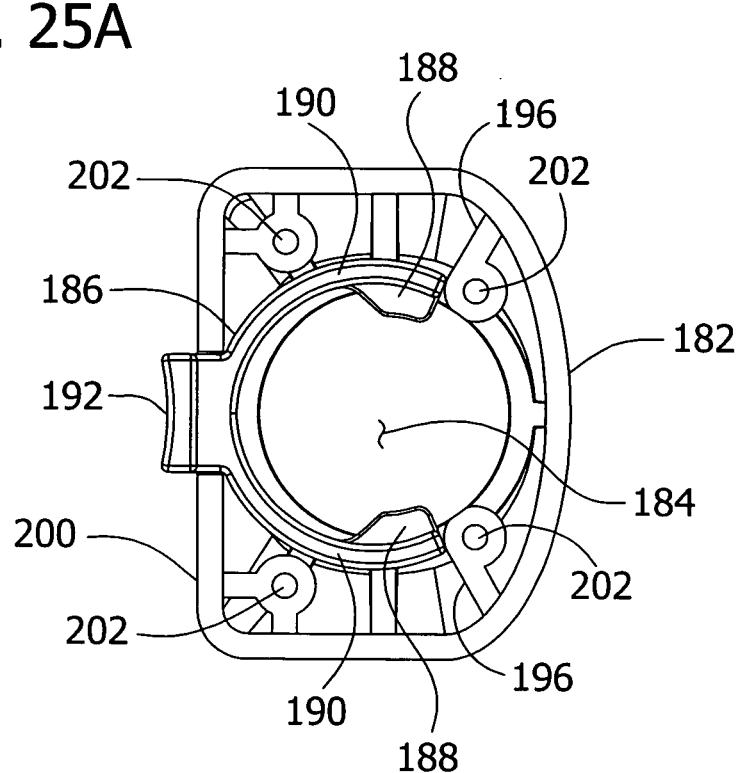
FIG. 25A is an elevation of a back end of the female component showing the catch with tabs projecting into the interior chamber.
Figure 25B:
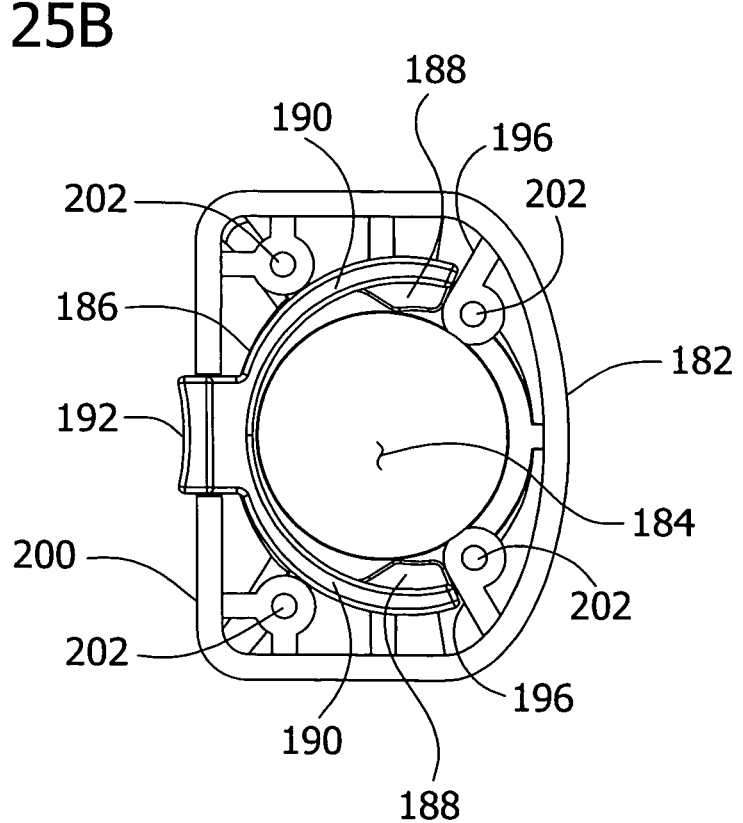
FIG. 25B is an elevation similar to FIG. 25A but with the catch deformed causing the tabs to move substantially out of the interior chamber of the female component.

Referring to FIGS. 23-25B, the female component 118 includes a generally tapered body 182 defining an interior chamber 184 sized and shaped for receiving the shaft of the male component 116, including the stem 124 and sleeve 156. A catch 186 including two tabs 188 extends into the interior chamber 184 of the female component 118 for cooperating with the groove 170 on the male component 116 to secure the male component with respect to the female component. The catch 186 is generally wishbone shaped, comprising two legs 190 and a button 192 located at the apex of the legs. The tabs 188 are located near free ends of the legs 190. In the illustrated embodiment, the legs 190, button 192 and tabs 188 are formed as one piece of flexible, resilient material (FIG. 24A). The button 192 extends through a hole 194 in the body 182 of the female component 118 and can be depressed to selectively release the tabs 188 from the groove 170 on the male component 116 to thereby allow the male component to be removed from the female component. Two slides 196 (broadly, "a release") that slope downward and away from the interior chamber 184 of the body 182 of the female component 118 are formed in the body of the female component so that they engage the tabs 188 of the catch 186 (FIGS. 25A and 25B). As a result, depression of the button 192 causes the tabs 188 to move along the slides 196 away from the interior chamber 184 to a position free of engagement with the groove 170 in the male component 116. The catch 186 is resiliently deformed in this action and therefore biased to a shape in which the tabs 188 project into the interior chamber 184 and engage the groove 170 in the male component 116.

Referring to FIGS. 24B and 24C, the male component 116 is adapted for insertion into the interior chamber 184 of the female component 118 past the catch 186 so that the tabs 188 of the catch are received in the groove 170. Particularly, the sleeve 156 of the male component 116 has a beveled edge 125 adapted to engage the catch 186 during insertion of the male component into the interior chamber 184 of the female component 118 and deform the catch (i.e., spread the tabs 188 apart) to permit the male component to pass the catch when being pushed into the interior chamber (see FIG. 24B). Once inserted, the peripheral rim 158 of the sleeve 156 is arranged generally parallel to the tabs 188 of the catch 186 for preventing movement of the male component 116 past the catch in a direction out of the interior chamber 184. In other words, the tabs 188 of the catch 186 are received in the groove 170 and secure the male component 116 against axial movement (see FIG. 24).

Figure 26A:
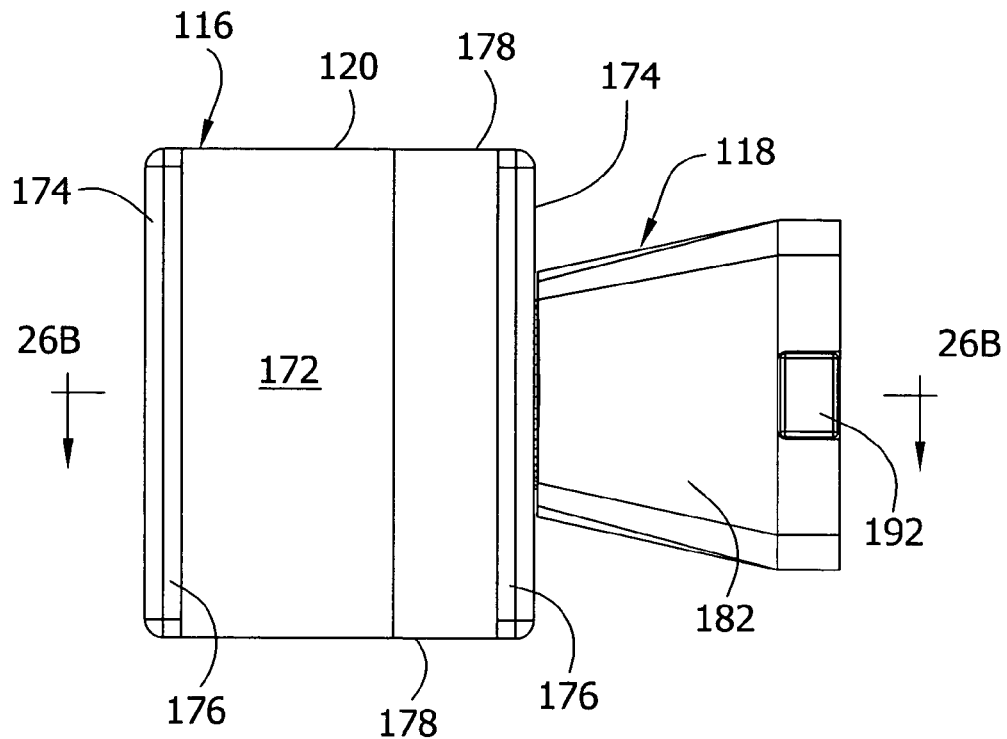
FIG. 26A is an elevation of the male and female components in an engaged position wherein relative rotation of the components is inhibited.
Figure 26B:
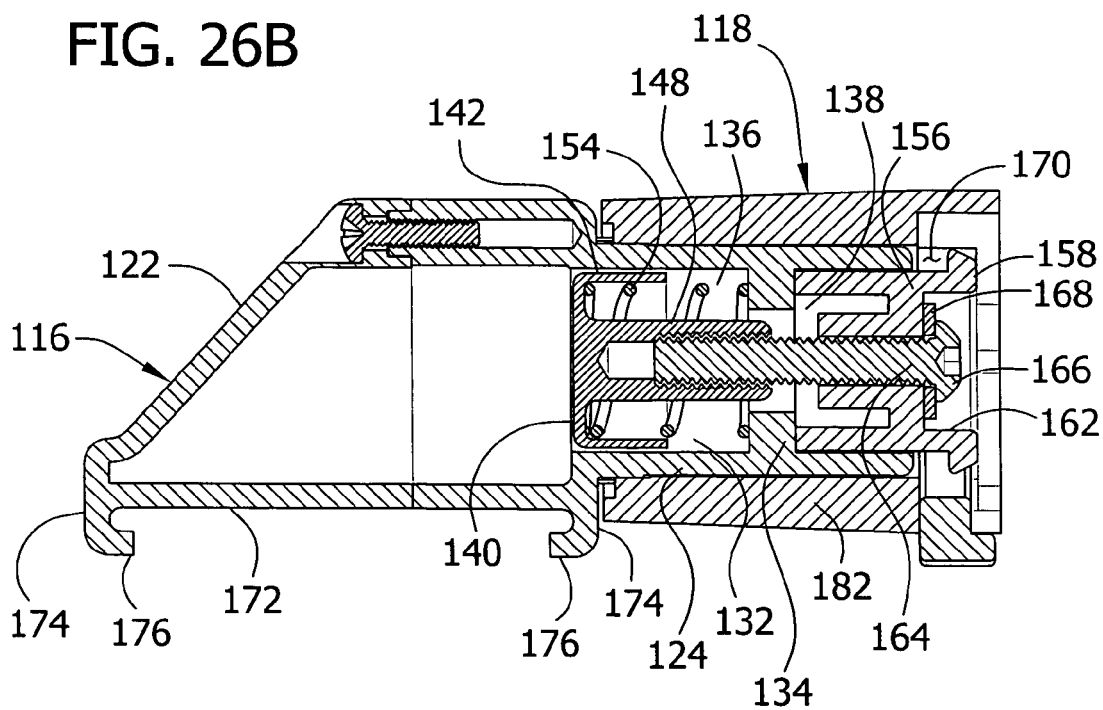
FIG. 26B is a section taken along line 26B-26B of FIG. 26A.
Figure 27A:
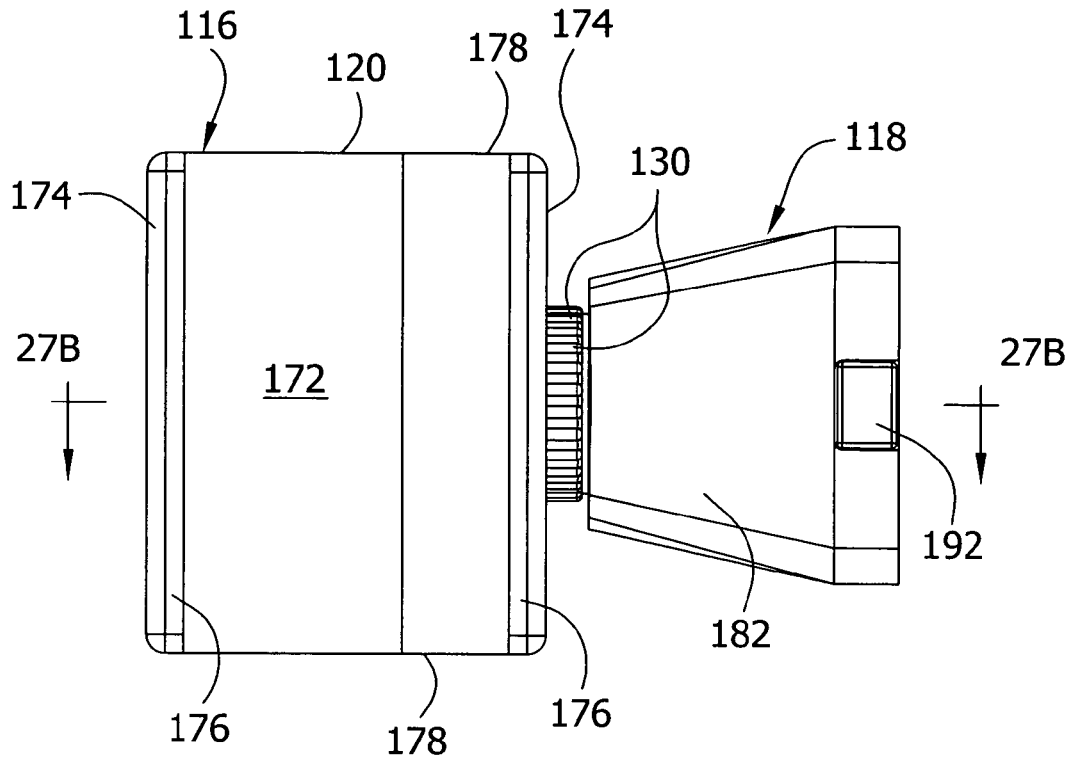
FIG. 27A is an elevation of the male and female components in an engaged position wherein relative rotation of the components is allowed.
Figure 27B:
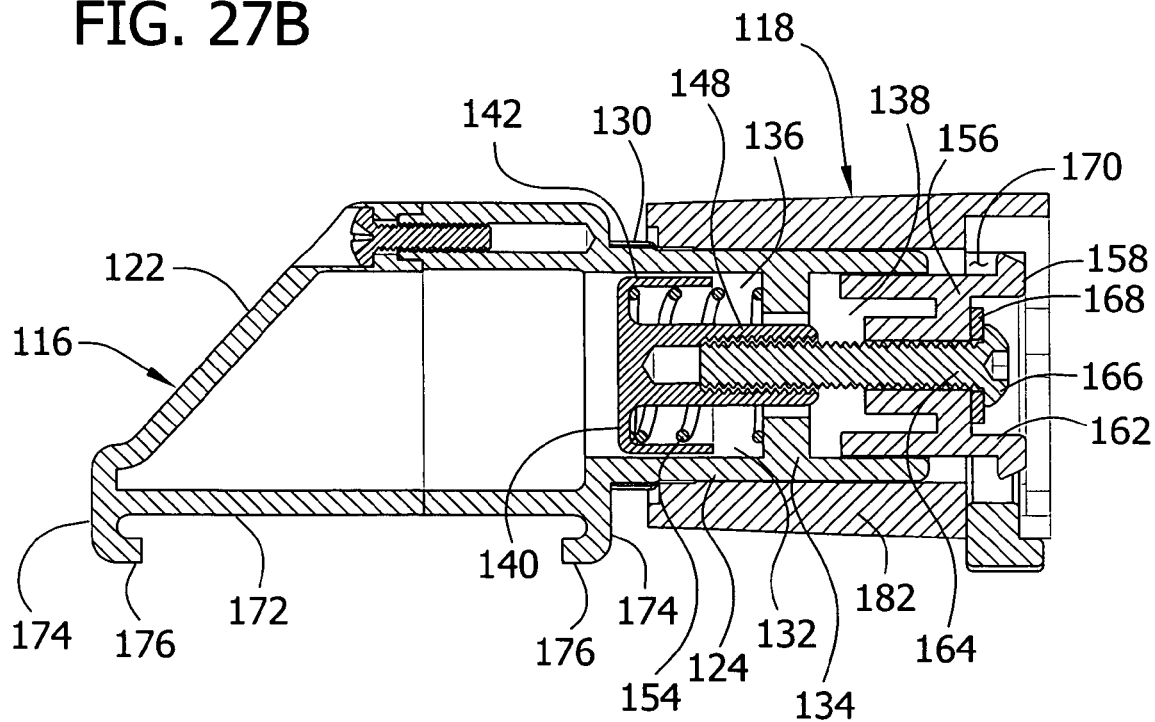
FIG. 27B is a section taken along line 27B-27B of FIG. 27A.

The female component 118 also includes detents 198 located adjacent an entrance to the interior chamber 184 (FIG. 23) so that when the male component 116 is engaged with the female component, the detents 130, 198 intermesh and prevent rotation of the male component 116 with respect to the female component about the axis of the stem 124 (FIGS. 26A and 26B). However, the male component 116 can be moved axially outward from the interior chamber 184 of the female component so that the detents 130 positioned on the male component 116 are substantially free of the detents 198 on the female component 118 thereby to allow the male component to be rotated with respect to the female component (FIGS. 27A and 27B). This can occur without releasing the connection of the male and female components 116, 118.

By pulling axially outward on the cradle 12, the male component 116, including specifically the stem 124 and housing 122, moves outwardly from the interior chamber 184 of the female component 118. The sleeve 156 is held in place against such axial movement by engagement of the rim 158 with the tabs 188 of the catch 186. Thus the remainder of the male component 116 (including specifically stem 124) moves axially relative to the sleeve 156 and plug 140, permitting the detents 130, 198 to disengage. This movement causes the interior ring 134 of the stem 124 to compress the spring 154 against the plug 140 so that the spring develops a strong force biasing the stem to move back into the interior chamber 184 of the female component 118 when the pulling force is withdrawn. As a result, the coupler 16 has a first position wherein the cradle 12 attached to the male component 116 is spaced a first distance from the female component 118 and is fixed rotationally relative to the female component (FIGS. 26A and 26B), and a second position wherein the cradle is spaced a second distance greater than the first distance from the female component and is free to rotate with respect to the female component (FIGS. 27A and 27B). Thus, the cradle 12 supporting the data collector D can be easily rotated to a desired angle using one hand and without disconnecting it from the clamp 14.

Figure 28:
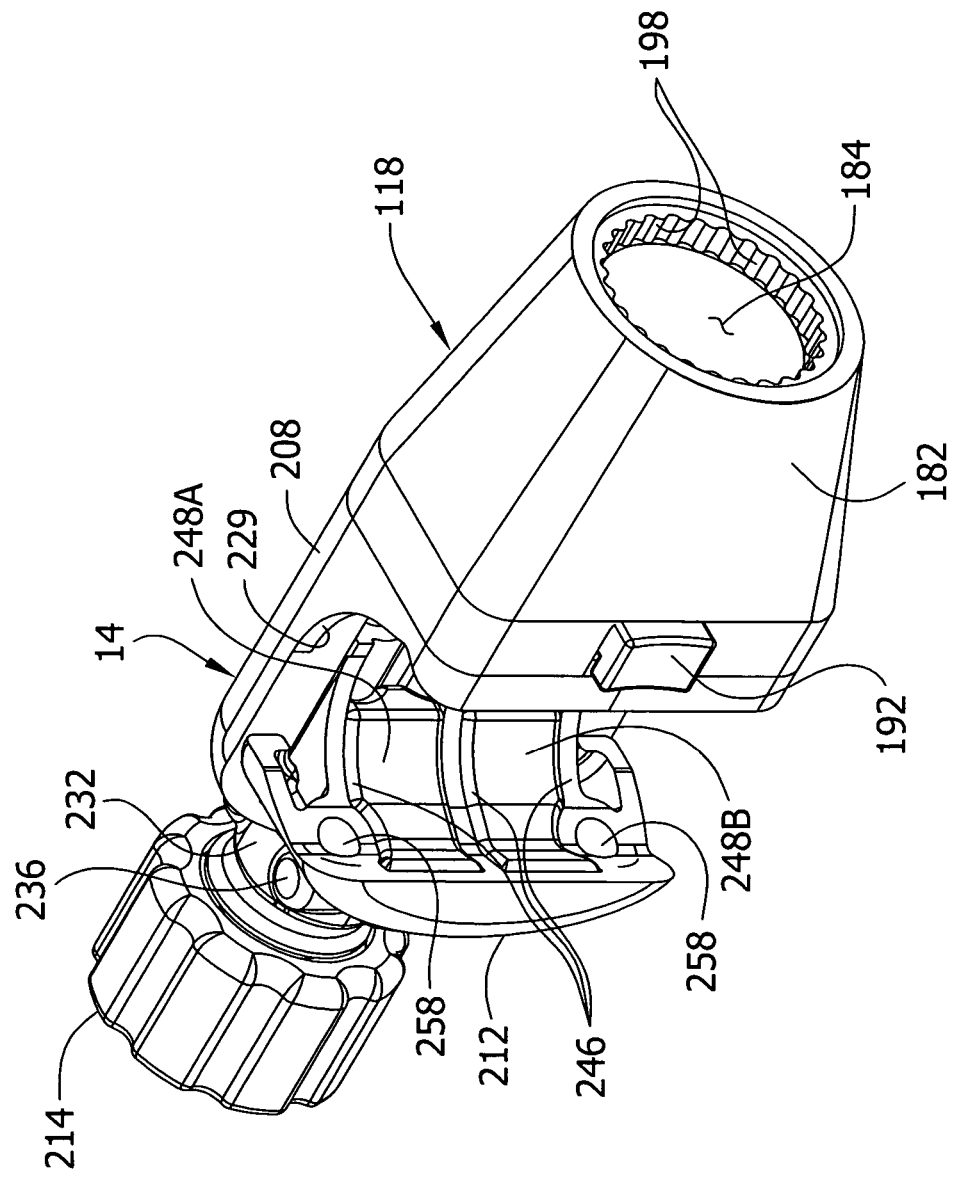
FIG. 28 is a perspective of the female component of the coupler attached to the clamp showing the interior chamber of the female component.

As shown in FIGS. 25A and 25B, the body 182 of the female component 118 also includes a back end 200. The back end 200 has four fastening holes 202 for receiving fasteners 204 (FIG. 30) for attaching the female component 118 to the clamp 14. FIG. 28 illustrates the female component 118 attached to the clamp 14.

Figure 29:
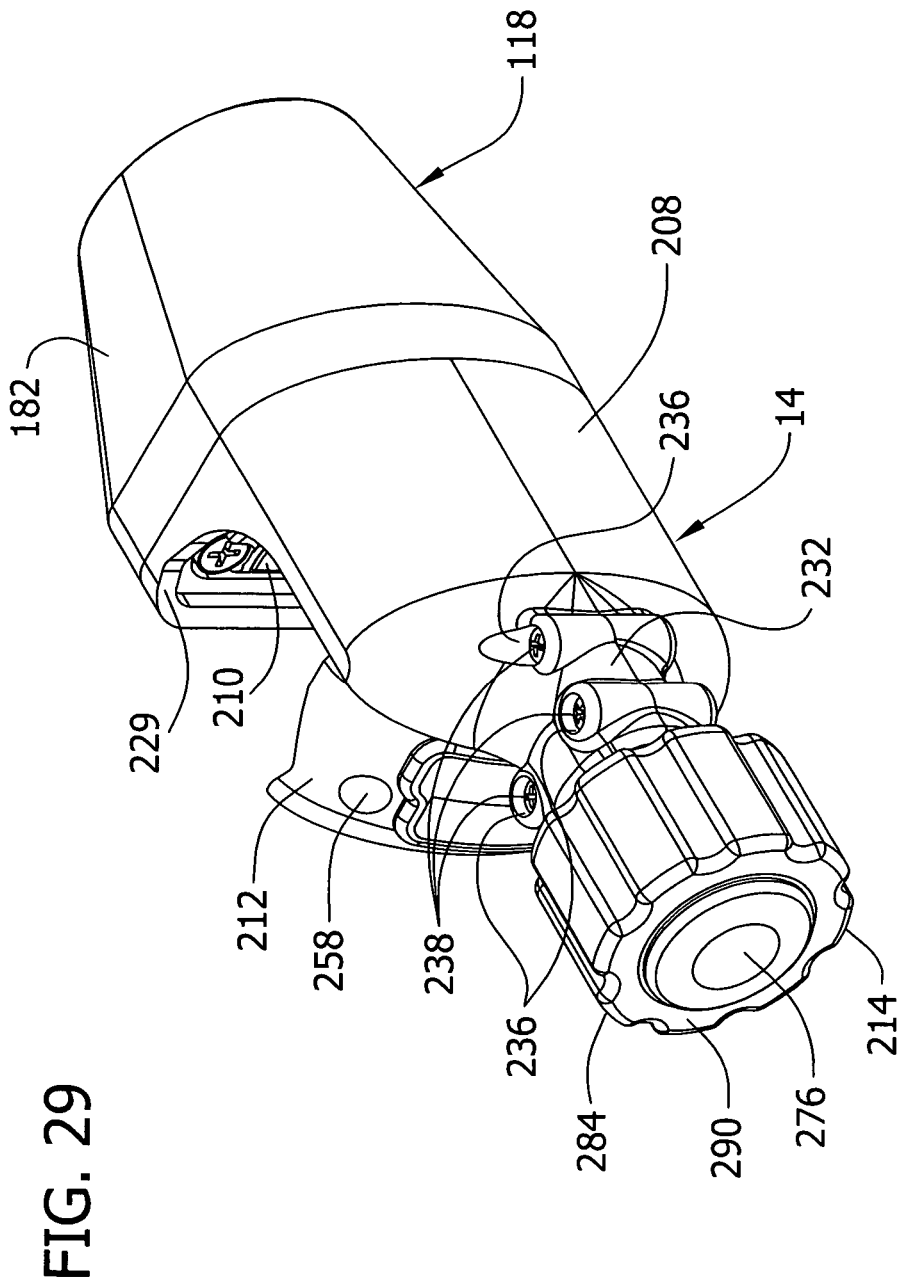
FIG. 29 is a perspective of the female component of the coupler attached to the clamp.
Figure 30:
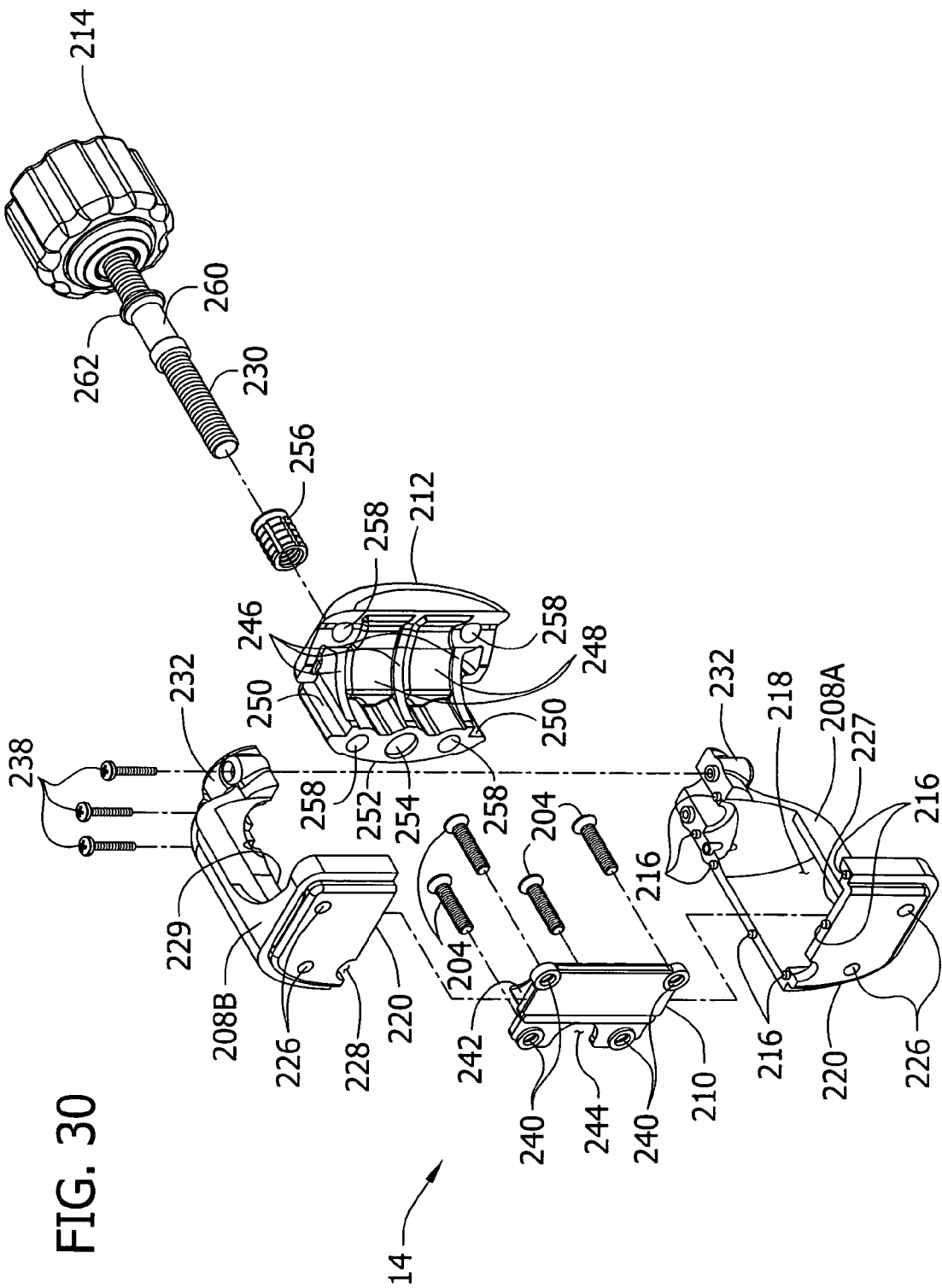
FIG. 30 is an exploded perspective of the clamp.

Referring now to FIGS. 28-30, the clamp 14 comprises a rigid clamp body 208, an anvil 210, a moveable jaw member 212, and a driver 214 for moving the moveable jaw member in relation to the anvil. The clamp body 208 is formed by two body elements 208A, 208B that are connected together. The first body element 208A has a plurality of spaced protrusions 216 for insertion into one of a plurality of spaced sockets (not shown) formed in the second body element 208B. The clamp body 208 defines a channel 218 for receiving the moveable jaw member 212 and for allowing the moveable jaw member to move with respect to the channel.

An end wall 220 of the clamp body 208 has an exterior raised portion 226 for insertion into the female component 118 of the coupler 16. The end wall 220 has an interior recessed portion 227 for receiving the anvil 210 of the clamp 14 and an edge 229 surrounding the recessed portion. The wall 220 also has four fastener holes 226 for allowing the anvil 210 and the clamp body 208 to be fastened to the female component 118 of the coupler 16. The wall 220 also has another, larger hole 228 for receiving and maintaining the alignment of a screw 230 of the driver 214. A screw receiving portion 232 of the clamp body 208 has a passageway (not shown) through it for receiving the screw 230. Three fastener apertures 236 are located in the screw receiving portion 232 for receiving fasteners 238 for securing the clamp body 208 elements together.

The anvil 210 has four fastener holes 240 and a curved, but generally wedge-shaped elastomeric pad 242. The four fastener holes 240 are positioned for allowing fasteners 204 (e.g., screws) to pass through the fastener holes 226 in the end wall 220 and into the fastener holes 202 in the female component 118 of the coupler 16 to secure the anvil 210, clamp body 208, and female component 118 together. The anvil 210 also includes a semicircular recess 244 for allowing the screw 230 of the driver 214 to pass through the anvil and into the female component 118. The elastomeric pad 242 extends outwardly beyond the edge 229 of the clamp body 208. As a result, the elastomeric pad 242 of the anvil 210 and the edge of the clamp body 208 cooperate to define a second jaw member for securing the support in the clamp 14. The second jaw member is sized and shaped for general conformance to a surface of the geomatics pole G or tripod T. The pad 242 increases the frictional engagement of the anvil 210 with the geomatics support to inhibit the clamp 14 from movement with respect to the support.

Figure 31A:
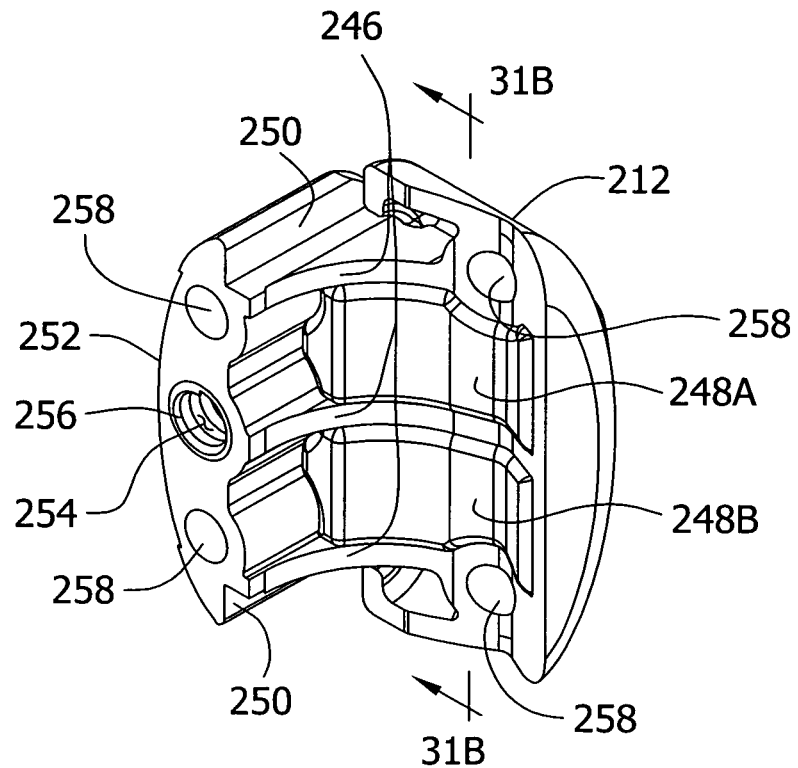
FIG. 31A is a perspective of a jaw member of the clamp showing an engagement surface.
Figure 31B:
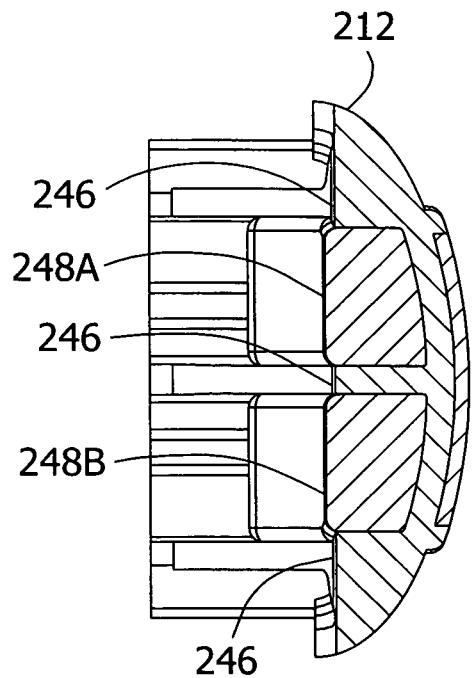
FIG. 31B is a section taken along line 31B-31B of FIG. 31A.

The jaw member 212 (or "first jaw member") is moveable relative to the anvil 210 between a secured positioned wherein the jaw and second jaw members are secured to the geomatics support and an unsecured positioned wherein the clamp 14 can be moved relative to the geomatics support. The first and second jaw members cooperate to define a jaw for securing the clamp 14 to the support. As shown in FIGS. 31A and 31B, the jaw member 212 includes an engagement surface sized and shaped for general conformance to a surface of the geomatics support (in this case, a geomatics pole G). The engagement surface includes a rigid pole engagement surface 246 and an elastomeric pad 248 for engaging the geomatics pole G in the secured position of the clamp 14. The elastomeric pad 248 has two pad segments 248A, 248B.

The elastomeric pad segments 248A, 248B have curved surfaces for conformally engaging the pole G while the rigid pole engaging surface 246 has a generally rounded surface for engaging in the pole. As a result, in the unsecured position, the elastomeric pad 248 projects above the rigid surface 246 such that when the jaw member 212 is brought into contact with the geomatics pole G (or tripod T) the elastomeric pad 248 contacts the geomatics pole and the pole is substantially free of contact with the rigid surface 246. In the secured position, the elastomeric pad 248 is compressed such that both the elastomeric pad and rigid surface 246 contact the geomatics pole. As a result, the clamp 14 grips the pole G more tightly at a relatively low compression.

The jaw member 212 is sized and shaped for being received in the channel 218 of the clamp body 208. More particularly, the jaw member 212 has shoulder members 250 and an arcuate surface 252 for being received in the channel 218 of the clamp body. Thus, the jaw member 212 is adapted to slide with respect to the clamp body 208, guided by the channel 218. In addition, the jaw member 212 has an opening 254 with an insert 256 positioned in the opening. The insert 256 has interior threads receiving the screw 230 of the drive 214 and causing movement of the drive to be transferred to the jaw member 212 to thereby move the jaw member linearly with respect to the clamp body 208. The jaw member 212 also has four holes 258 extending therethrough for allowing a screw driver (not shown) to be inserted through the holes for accessing the fasteners 204 securing the anvil 210 and wall 220 of the clamp body 208 to the female component 118. A bushing 260 is mounted on the screw 230 for use in inhibiting axial movement of the screw relative to the clamp body 208 and anvil 210. The bushing 260 and a washer 262 are positioned on the screw 230 adjacent the screw receiving portion 232 of the clamp body 208 (FIG. 30).

Figure 32:
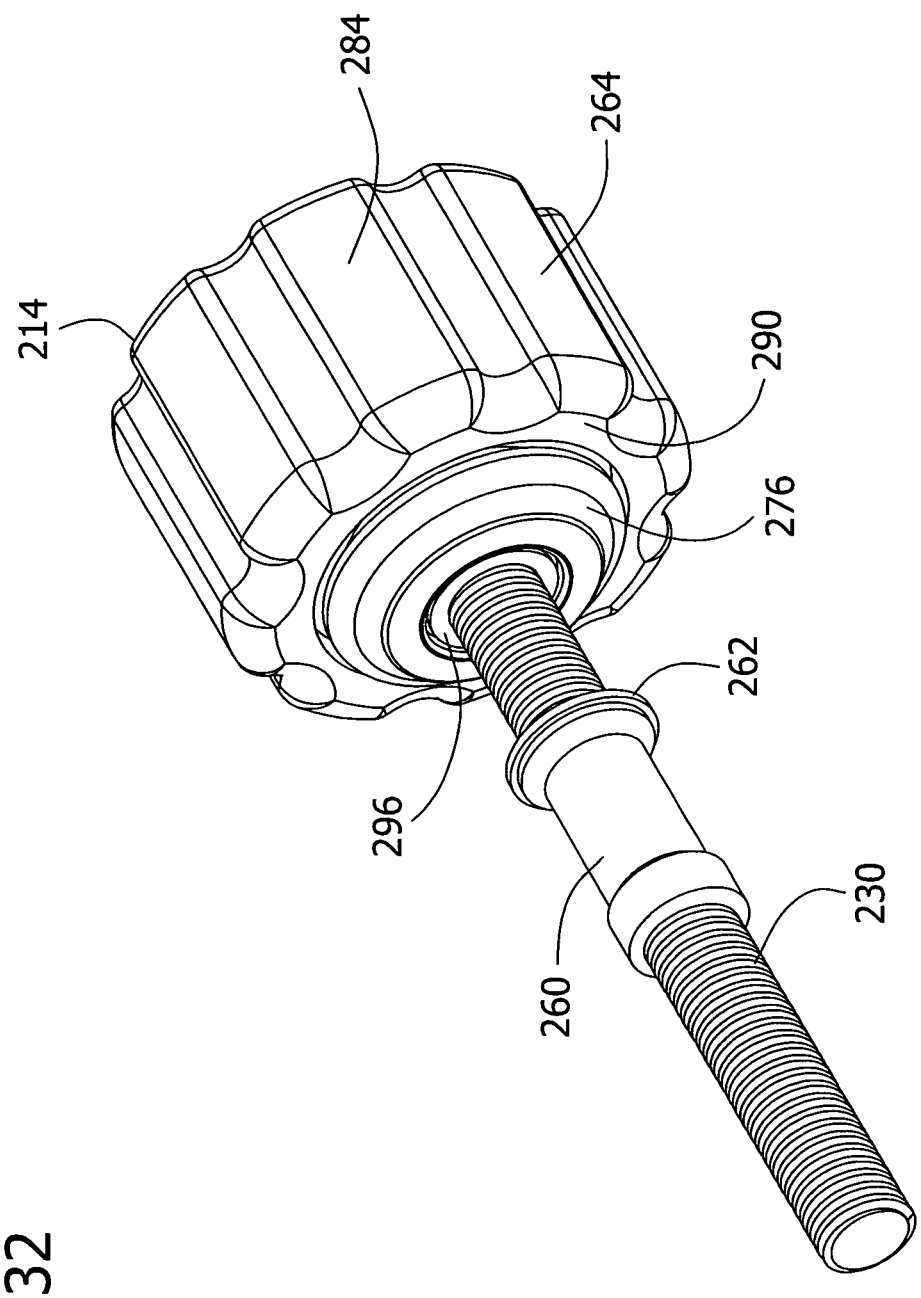
FIG. 32 is a perspective of a threaded driver for the jaw member.
Figure 33:
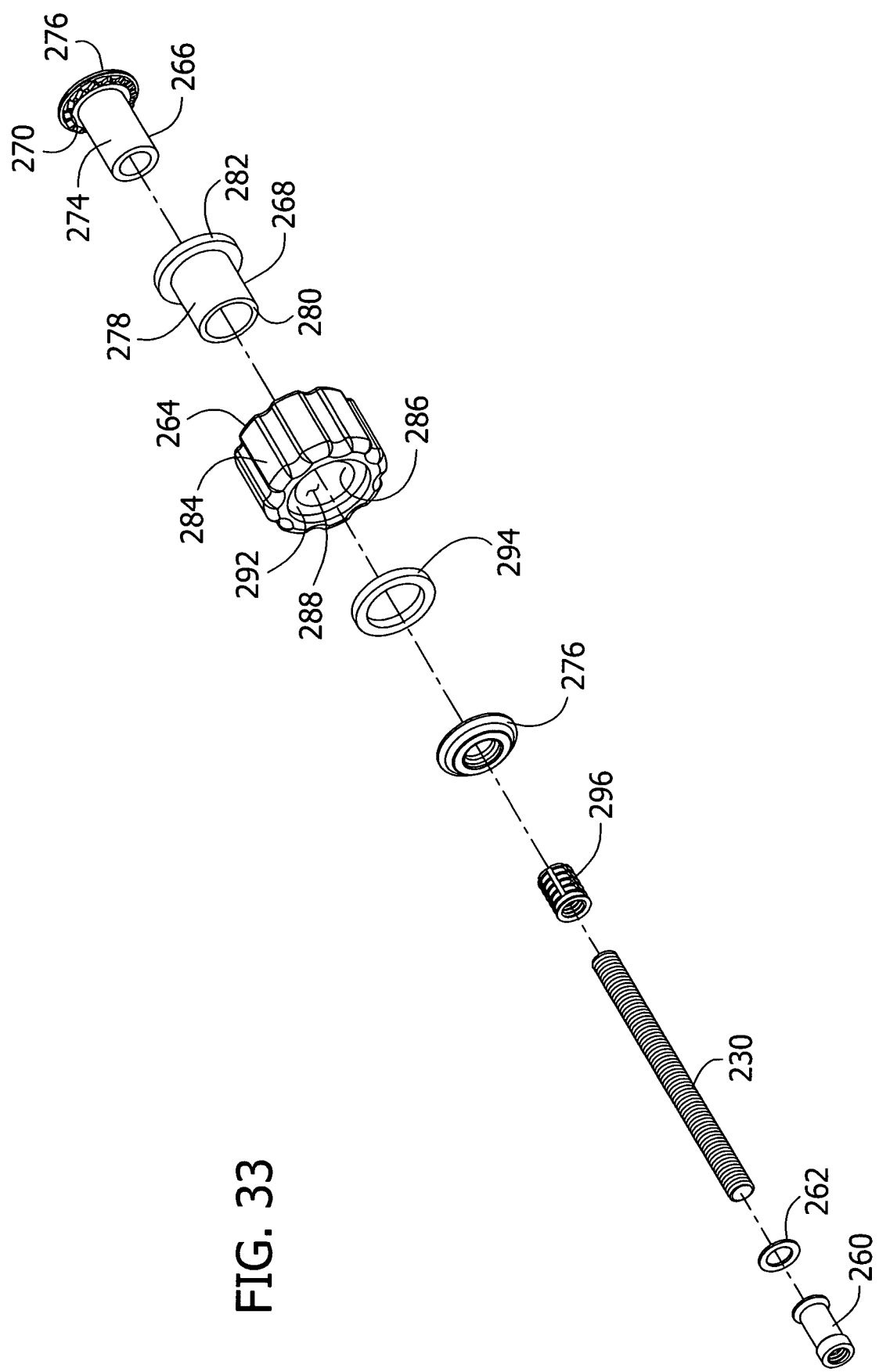
FIG. 33 is an exploded perspective of the driver.

The driver 214, as shown in FIGS. 32 and 33, includes a hand grip 264 and the screw 230 threadably connected to the jaw member 212. Rotation of the hand grip 264 causes the jaw member 212 to move along the screw 230 between the secured and unsecured positions. The driver 214 further comprises a torque limiter to inhibit overtightening of the jaw member 212 against the geomatics support and thereby prevent damage to the geomatics support. The torque limiter comprises a clutch interconnecting the hand grip 264 and the screw 230 that is adapted to permit relative rotation of the hand grip and screw upon encountering resistance in only one direction (i.e., clockwise) corresponding to moving the jaw member 212 toward the secured position.

Figure 34:
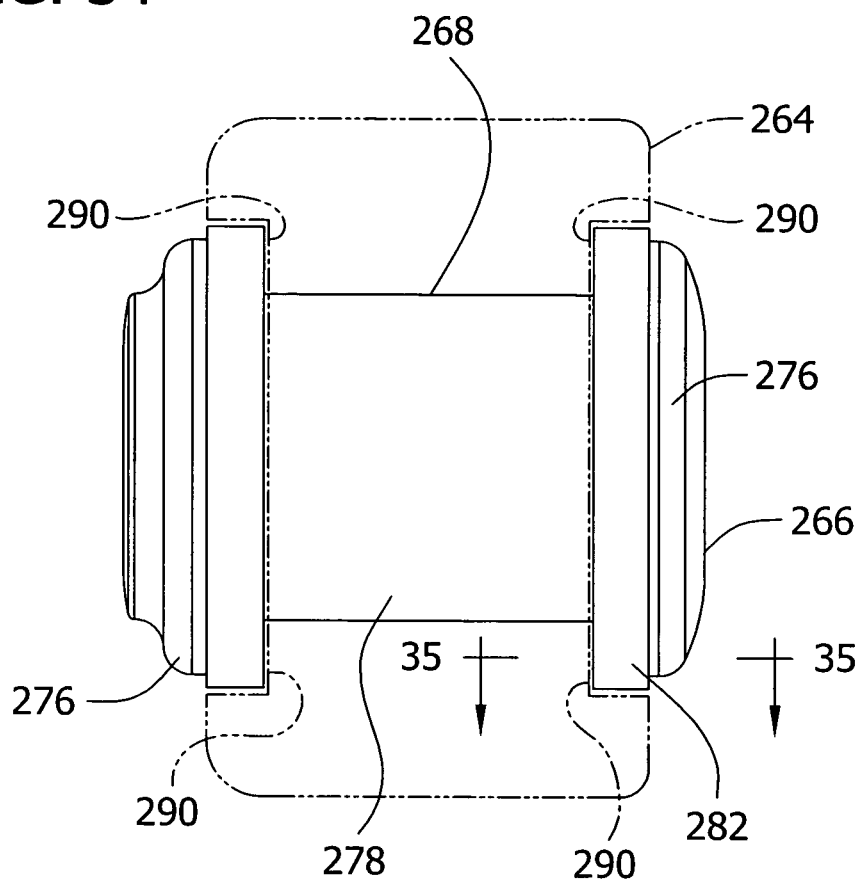
FIG. 34 is a perspective of first and second clutch elements of the driver interlocked for conjoint rotation.
Figure 35:
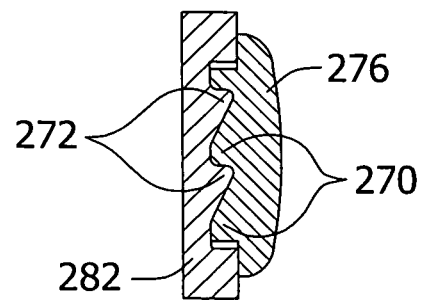
FIG. 35 is a section taken along line 35-35 of FIG. 34 showing teeth of the first and second clutch elements drivingly engaged.
Figure 36:
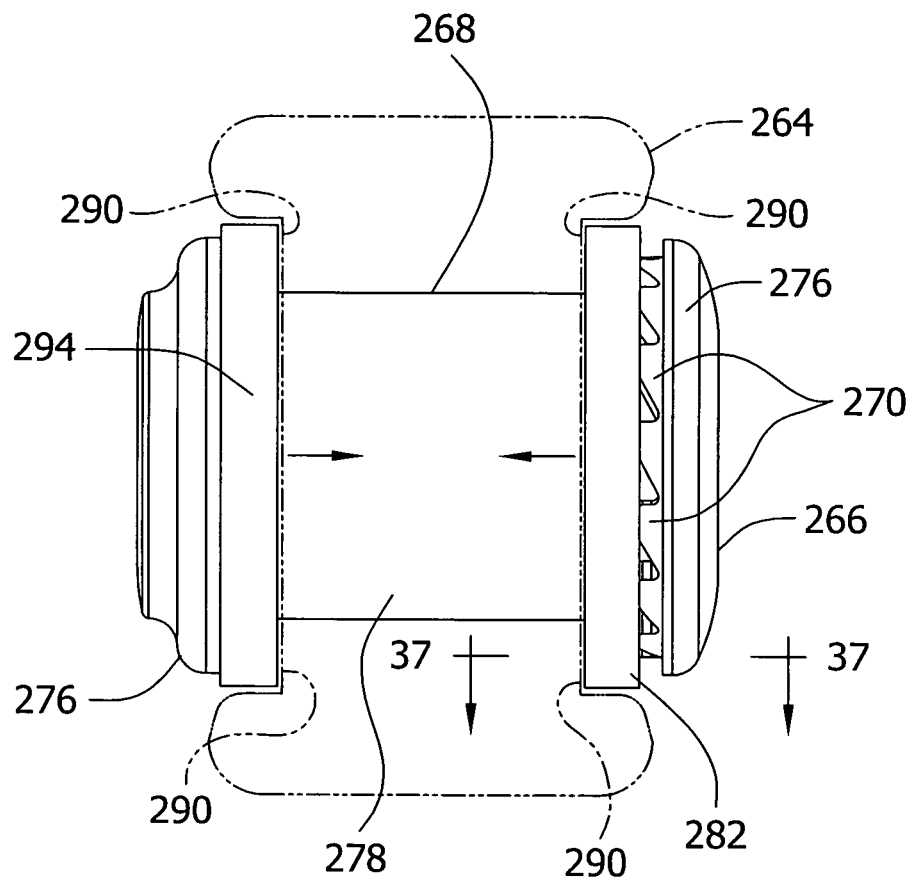
FIG. 36 is a perspective of the first and second clutch elements in a release position in which the second clutch element rotates relative to the first clutch element.
Figure 37:
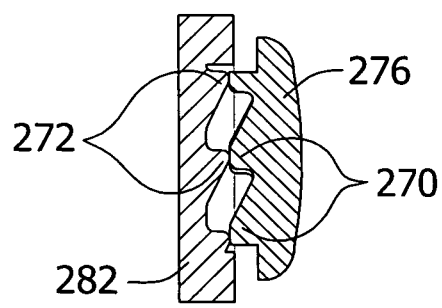
FIG. 37 is a section taken along line 37-37 of FIG. 36 showing the teeth of the second clutch element passing over the teeth of the first clutch element.

The clutch has a first clutch element 266 fixed to the screw 230 and a second clutch element 268 mounting the hand grip 264 and supported by the first clutch element for axial translation relative to the first clutch element between a drive position in which the first and second clutch elements are interlocked for conjoint rotation (FIGS. 34 and 35) and a release position in which the second clutch element rotates relative to the first clutch element (FIGS. 36 and 37). The first and second clutch elements 266, 268 are formed with inclined teeth 270, 272 that drivingly engage each other in the drive position and disengage each other in the release position. The teeth 270, 272 are generally sawtooth shaped to provide greater resistance to relative rotation of the first and second clutch elements 266, 268 in a first direction (i.e. counterclockwise) than in a second, opposite direction (i.e., clockwise).

The first clutch element 266 of the driver includes a head 274 having flanged ends 276 fixed to the screw 230 for conjoint rotation therewith. The first clutch element 266 also includes a threaded insert 296 (broadly, "connector") for connecting the first clutch element to the screw 230. The second clutch element 268 includes a sleeve 278 with a free end 280 and a flanged end 282. The grip 264 that bears against the sleeve 278 and head 274 for rotation of the screw 230 up to a threshold torque. Specifically, the flanged end 282 of the sleeve 278 and one of the flanged ends 276 of the head 274 have the inclined teeth 270, 272 that drivingly engage each other. The hand grip 264 is resiliently deformable so that upon reaching the threshold torque the grip is deformed thereby allowing the sleeve 276 to axially move with respect to the head 274 (see, FIG. 36). The deformed handgrip 264 is shown in phantom in FIG. 36. As a result, the teeth 272 of the flanged end 282 of the sleeve 278 pass over the teeth 270 of the flanged end 276 of the head 274 (FIGS. 36 and 37), which allows the grip 264 and sleeve 278 to rotate relative to the head and screw. Thus, the threshold torque is directly proportional to the resiliency of the grip 264.

The grip 264 has an outer cylindrical wall 284 and an inner cylindrical wall 286 defining a passage 288 through the grip. The outer cylinder wall 284 is undulating to form an easy-to-grip surface. The grip 264 also has two sides 290 (i.e, ends) extending between the outer and inner walls 284, 286. Each side 290 has a recess 292 adjacent the inner wall 286 that is sized and shaped for receiving the flange end 276 of the sleeve 278 in one of the recesses, and a washer 294 in the other recess. The washer 294 has an inner diameter greater than the outer diameter of the sleeve 278 so that the free end 280 of the sleeve can pass through the inner diameter of the washer when the sleeve is moved axially.

In use, a portion of an object, such as a geomatics support, is placed in the clamp body 208 of the clamp 14 such that the first and second jaw members are disposed on opposite sides of the support. Next, the hand grip 264 of the driver 214 is rotated in a clockwise direction to move the jaw member 212 via the screw 230 from an unsecured position to a secured position wherein the support is secured between the jaw members. The wedge-shaped elastomeric pad 242 of the anvil 210 and the edge 229 of the clamp body 208 are generally sized and shaped to conform to the surface of the support as the first jaw member 212 moves the support against the second jaw member. As the support is pushed by the jaw member 212 against the elastomeric pad 242 of the anvil 210, the elastomeric pad 242 is compressed so that the rigid edge 229 of the clamp body 208 contacts the support. In the unsecured position, the elastomeric pad segments 248A, 248B of the jaw member 212 contact the support while the rigid surface 246 of the jaw member is substantially free of contact with the support. As the jaw member 212 is tightened against the support to the secured position, the elastomeric pad 248 is compressed such that both the elastomeric pad and rigid surface 246 contact the support to securely mount the clamp on the support. Thus, the stress applied to the support by the clamp 14 is applied over a large surface area of the support.

As stated above, the torque limiter of the driver 214 inhibits overtightening of the jaw member 212 against the support and thereby prevents damage to the geomatics support. In the drive position, rotation of the hand grip 264 causes rotation of the first and second clutch element 266, 268 of the torque limiter and the screw 230 to thereby move the jaw member 212. In this position, the handgrip side 290 is undeformed (as shown in phantom in FIG. 34) and inclined teeth 270, 272 of the first and second clutch elements 266, 268 drivingly engage each other (FIG. 35). The biasing force applied by the hand grip 264 against the flanged end 282 of the sleeve 278 keeps the teeth 272 from riding up the incline of teeth 270. Upon reaching the threshold torque, the sides 290 of the hand grip 264 resiliently deform (as indicated by the arrows shown in FIG. 36) so that teeth 272 of the second clutch element 268 ride up and pass over the teeth 270 of the first clutch element 266 thereby causing the sleeve 276 to move axially with respect to the head 274 (FIGS. 36 and 37). As a result, the grip 264 and sleeve 278 rotate relative to the head and screw to inhibit further tightening of the jaw member 212 against the support. It will be understood a hand grip could be used in other configurations to limit the torque that can be applied.

To release the clamp 14 from the support, the hand grip 264 is rotated in a counterclockwise direction to move the jaw member away from the anvil 210 and the support. The teeth 270, 272 of the first and second clutch elements 266, 268 remain drivingly engaged with each other when the hand grip 264 is rotated counterclockwise because the engaging surfaces of the teeth are perpendicular to the direction of rotation. In other words, the torque limiter only works when tightening the clamp 14 (i.e., when the hand grip 264 is rotated in a clockwise direction).

The various components of the mount system 10, excluding the insert 256, bushing 260, and screw 230, are molded from plastic. It is understood however that the components can be formed from other materials without departing from the scope of this invention. "Electrical", as used herein includes electric and other types of devices.

When introducing elements of the present invention or the preferred embodiment(s) thereof, the articles "a", "an", "the" and "said" are intended to mean that there are one or more of the elements. The terms "comprising", "including" and "having" are intended to be inclusive and mean that there may be additional elements other than the listed elements. The use of terms indicating a particular orientation (e.g., "top", "bottom", "side", etc.) is for convenience of description and does not require and particular orientation of the item described.

As various changes could be made in the above constructions without departing from the scope of the invention, it is intended that all matter contained in the above description or shown in the accompanying drawings shall be interpreted as illustrative and not in a limiting sense.

What is claimed is:

1. A cradle for a handheld electrical device having a front, a back, a bottom, a top and sides, the cradle comprising:
    a base constructed to support the device such that the device can be freely placed on and removed from the base;
    at least one arm operatively connected to the base for movement relative to the base and the device when supported on the base; and
    a slide actuator operable to move the arm relative to the base back and forth between a release position wherein the arm is spaced from the device, allowing the device to be freely removed from and placed on the base, and a hold position wherein the arm is closer to the device for engaging and holding the device in the cradle.

2. A cradle as set forth in claim 1 further comprising another arm operatively mounted on the base for movement relative to the base, the arms being disposed generally on opposite sides of the device when supported by the base, in the release position the arms being spaced apart from each other a first distance and in the hold position the arms being spaced apart from each other a second distance less than the first distance.

3. A cradle as set forth in claim 2 wherein the arms are shaped so that in the release position no portion of either arm is disposed opposite the front or back of the device, and in the hold position portions of the arms are arranged in a position opposite to the front of the device.

4. A cradle as set forth in claim 1 wherein said arm comprises a finger projecting outwardly therefrom.

5. A cradle as set forth in claim 1 wherein the actuator is adapted to move said arm linearly between the release and hold positions.

6. A cradle as set forth in claim 5 wherein the actuator is movable linearly along the base to move said arm between the release and hold positions.

7. A cradle as set forth in claim 6 wherein the movement of said arm is generally orthogonal to the movement of the actuator.

8. A cradle as set forth in claim 1 wherein said base comprises a retainer projecting outwardly from the base and arranged for supporting at least a bottom of the device.

9. A cradle as set forth in claim 8 wherein the retainer is also arranged to engage sides of the device to restrain lateral movement of the device with respect to the base.

10. A cradle as set forth in claim 8 wherein the retainer is discontinuous, comprising a bottom flange and at least two opposing flanges.

11. A cradle as set forth in claim 1 further comprising a mount for mounting the cradle on an object.

12. A cradle as set forth in claim 11 wherein the object has opposite sides and said mount is adapted to mount the cradle to the object such that the cradle can be positioned on either side of the object to facilitate use of the electronic device by either a left handed or right handed user.

13. A cradle as set forth in claim 11 further comprising a coupler releasably connecting the mount to the base.

14. A cradle as set forth in claim 13 wherein the coupler includes a push button release for releasing the mount from the base.

15. A cradle as set forth in claim 14 wherein the coupler is adapted to allow rotation of the base with respect to the mount while remaining attached to the mount such that the angle at which the electronic device is supported by the base can be changed.

16. A cradle as set forth in claim 15 wherein the coupler comprises a first set of detents, said mount including a second set of detents for selectively engaging with said first set of detents to inhibit rotation of the base with respect to the mount, the coupler being moveable to a position where said first set of detents is substantially free of engagement with the second set of detents for allowing rotation of the base with respect to the mount.

17. A cradle a set forth in claim 16 wherein said sets of detents are biased toward the engaged position.

* * * * *